US011985609B2

(12) United States Patent
Miao

(10) Patent No.: US 11,985,609 B2
(45) Date of Patent: *May 14, 2024

(54) BEAM-SPECIFIC POWER CONTROL

(71) Applicant: Apple Inc., Cupertino, CA (US)

(72) Inventor: Honglei Miao, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/074,374

(22) Filed: Dec. 2, 2022

(65) Prior Publication Data

US 2023/0107153 A1    Apr. 6, 2023

Related U.S. Application Data

(63) Continuation of application No. 16/650,802, filed as application No. PCT/US2018/026213 on Apr. 5, 2018, now Pat. No. 11,523,353.
(Continued)

(51) Int. Cl.
*H04W 52/08* (2009.01)
*H04B 7/06* (2006.01)
(Continued)

(52) U.S. Cl.
CPC .......... *H04W 52/42* (2013.01); *H04B 7/0695* (2013.01); *H04B 7/088* (2013.01);
(Continued)

(58) Field of Classification Search
CPC ..... H04W 52/32; H04W 52/34; H04W 52/08; H04W 52/18; H04W 52/38; H04W 52/60;
(Continued)

(56) References Cited

U.S. PATENT DOCUMENTS 8,428,521 B2   4/2013   Luo et al.
11,523,353 B2  12/2022  Miao et al.
(Continued)

FOREIGN PATENT DOCUMENTS

CN   101611565 A   12/2009
CN   104205955 A   12/2014
(Continued)

OTHER PUBLICATIONS

Notice of Allowance, dated Jun. 27, 2022, for Korean Patent Appl. No. 10-2020-7008818, 3 pages (with translation).
(Continued)

*Primary Examiner* — Tu X Nguyen
(74) *Attorney, Agent, or Firm* — Sterne, Kessler, Goldstein & Fox P.L.L.C.

(57) ABSTRACT

Some embodiments include a processor that receive configuration information from a base station, and store based on the configuration information, a power control (PC) parameter set of a PC process that corresponds to a downlink (DL) reference signal (RS) or a beam-pair link (BPL), where the PC parameter set includes a path loss scaling factor, a command to perform a closed-loop PC process, or a path loss change parameter to be used to trigger a power headroom report (PHR). The processor can perform a PC procedure with respect to the DL RS or the BPL based on the PC parameter set, calculate a path loss estimate based on a downlink reference signal or the BPL, determine the PHR based on the path loss estimate and the path loss change parameter, calculate a power headroom value based on the PC parameter set, and transmit the PHR including the power headroom value.

20 Claims, 12 Drawing Sheets

Related U.S. Application Data

(60) Provisional application No. 62/563,467, filed on Sep. 26, 2017.

(51) Int. Cl.
| | | |
|---|---|---|
| *H04B 7/08* | (2006.01) | |
| *H04W 52/24* | (2009.01) | |
| *H04W 52/36* | (2009.01) | |
| *H04W 52/42* | (2009.01) | |
| *H04W 72/1273* | (2023.01) | |

(52) U.S. Cl.
CPC ......... *H04W 52/08* (2013.01); *H04W 52/242* (2013.01); *H04W 52/365* (2013.01); *H04W 52/367* (2013.01); *H04W 72/1273* (2013.01)

(58) Field of Classification Search
CPC ... H04W 52/58; H04B 17/318; H04B 17/309; H04B 17/327; H04B 7/0413; H04B 7/0408
See application file for complete search history.

(56) References Cited

U.S. PATENT DOCUMENTS

| | | |
|---|---|---|
| 2005/0197149 A1 | 9/2005 | Iacono et al. |
| 2013/0114562 A1 | 5/2013 | Seo et al. |
| 2013/0250875 A1 | 9/2013 | Chen et al. |
| 2014/0198744 A1 | 7/2014 | Wang et al. |
| 2015/0201383 A1 | 7/2015 | Papasakellariou et al. |
| 2016/0227485 A1 | 8/2016 | Davydov et al. |
| 2019/0387483 A1* | 12/2019 | Lee ................. H04W 52/42 |
| 2020/0383060 A1 | 12/2020 | Park et al. |
| 2021/0204229 A1 | 7/2021 | Miao et al. |

FOREIGN PATENT DOCUMENTS

| | | |
|---|---|---|
| CN | 105122900 A | 12/2015 |
| JP | 2014-506101 A | 3/2014 |
| JP | 2017-503429 A | 1/2017 |
| KR | 100653174 B1 | 12/2006 |
| KR | 10-2011-0084311 A | 7/2011 |
| KR | 10-2012-0054042 A | 5/2012 |
| KR | 101397135 B1 | 5/2014 |
| KR | 10-2014-0071479 A | 6/2014 |
| WO | WO 2011082531 A1 | 7/2011 |
| WO | WO 2012008773 A2 | 1/2012 |
| WO | WO 2012024338 A1 | 2/2012 |
| WO | WO-2014/126773 A1 | 8/2014 |
| WO | 2017/146773 A1 | 8/2017 |
| WO | WO 2017143536 A1 | 8/2017 |
| WO | WO 2017146755 A1 | 8/2017 |
| WO | WO 2017146773 A1 | 8/2017 |

OTHER PUBLICATIONS

"On Multi-TRP and Multi-panel Transmission," R1-1716392, 3GPP TSG RAN WG1 NR Ad-Hoc #3, Sep. 18-21, 2017; 6 pages.

"Remaining Issues on Search Space Design,," RI-1715629, 3GPP TSG RAN WGI NR Ad Hoc #3, Sep. 18-21, 2017; 9 pages.

Korean Application No. 10-2020-7008818, Office Action dated Jan. 28, 2022, with attached English language translation from EPO Global Dossier; 30 pages.

International Search Report and Written Opinion directed to related International Patent Application No. PCT/US2018/026213, dated Jul. 11, 2018; 10 pages.

International Preliminary Report on Patentability directed to related International Patent Application No. PCT/US2018/026213, dated Mar. 31, 2020; 7 pages.

"On NR PHR calculation," RI-1712313, 3GPP TSG RAN WG I Meeting #90, Aug. 20, 2017; 6 pages.

"On the power headroom reporting," RI-1714321, 3GPP TSG RAN WG I Meeting #90, Aug. 20, 2017; 5 pages.

Patent Search Report, dated Oct. 25, 2022, for Chinese Patent Appl. No. 2018800624444, 4 pages with English translation.

Notification of the First Office Action, dated Nov. 2, 2022, for Chinese Patent Appl. No. 2018800624444, 17 pages with English translation.

CMCC, "Beam specific UL power control procedure", 3GPP tsg_ran\WG1_RL1, R1-1708404, Issue TSGRI_89, May 6, 2017; 4 pages.

Second Chinese Office Action directed to related Chinese Application No. 2018800624444, dated May 30, 2023, with English-language translation of the Search Report attached; 9 pages.

Notice of Grant directed to related Chinese Application No. 201880062444.4, mailed Dec. 8, 2023, with English-language machine translation attached; 8 pages.

InterDigital Communications, "MAC Layer Impact of Supporting Different Numerologies," R1-1612357, 3GPP TSG-RAN WG1 #87, Reno, Nevada Nov. 14-18, 2016; 4 pages.

Samsung, "Power Control for Multi-Beam Operation," R1-1708068, 3GPP TSG RAN WG1 Meeting #89, Hangzhou, P.R. China May 15-19, 2017; 4 pages.

* cited by examiner

BEAM-SPECIFIC POWER CONTROL

RELATED APPLICATION

This application is a continuation of U.S. application Ser. No. 16/650,802, filed on Mar. 25, 2020, which is a U.S. National Phase of International Application No. PCT/US2018/026213, filed Apr. 5, 2018, which claims the benefit of U.S. Provisional Application No. 62/563,467 filed Sep. 26, 2017, all of which are incorporated herein by reference in their entireties.

FIELD

Embodiments of the present disclosure generally relate to the field of networks, and more particularly, to apparatuses, systems, and methods for beam-specific power control in cellular networks.

BACKGROUND

Third Generation Partnership Project ("3GPP") new radio ("NR") systems will utilize beam-specific power control. However, details of these concepts are not yet defined.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1A:
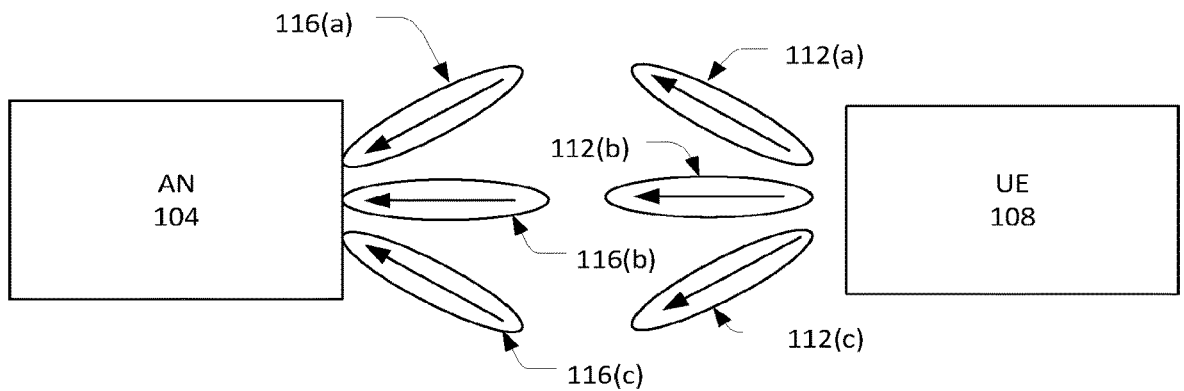
FIGS. 1(a) and 1(b) illustrate uplink and downlink beams of a network in accordance with some embodiments.

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed or described operations may be omitted in additional embodiments.

For the purposes of the present disclosure, the phrases "A or B," "A and/or B," and "A/B" mean (A), (B), or (A and B).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

In order to utilize beam-specific power control ("PC"), PC parameter sets or PC processes may be configured and handled on a beam-specific manner. For instance, when multiple beam-pair links ("BPLs") are maintained between a user equipment ("UE") and a network, closed-loop PC and power headroom reporting ("PHR") may be processed and communicated on a BPL basis by Equation (1) as follows:

$$P_{PUSCH,c}^{b} = \min\{P_{CMAX,c} - P_{PUCCH}, P_{0,PUSCH}^{b} + \alpha_{c}^{b} PL_{c}^{b} + 10\log_{10} M + V_{MCS} + g[t]_{c}^{b}\}.$$

The definitions of the symbols of Equation (1) are provided in Table 1 as follows.

TABLE 1

| Symbols | Definitions |
| --- | --- |
| b | Beam index |
| c | Serving cell index |
| $P_{PUSCH,c}^{b}$ | Transmission power of physical uplink shared channel ("PUSCH") in beam index b of serving cell c |
| $P_{CMAX,c}$ | Maximum transmission power in serving cell c |
| $P_{PUCCH}$ | Transmission power of physical uplink control channel ("PUCCH") |
| $P_{0,PUSCH}^{b}$ | Reference receive power of PUSCH in beam b of serving cell c |
| $\alpha_{c}^{b}$ | Configured scaling factor of path loss |
| $PL_{c}^{b}$ | Path loss estimate of beam b in serving cell c |
| M | Number of allocated resource blocks |
| $V_{MCS}$ | Scaling power factor of modulation and coding scheme ("MCS") |
| $g[t]_{c}^{b}$ | Command to perform closed-loop PC process at subframe t for beam b in serving cell c |

Embodiments of the present description describe detailed methods to realize efficient beam-specific power control to cope with different situations where different types of beam-specific signals can be associated with PC processes.

Figure 1B:
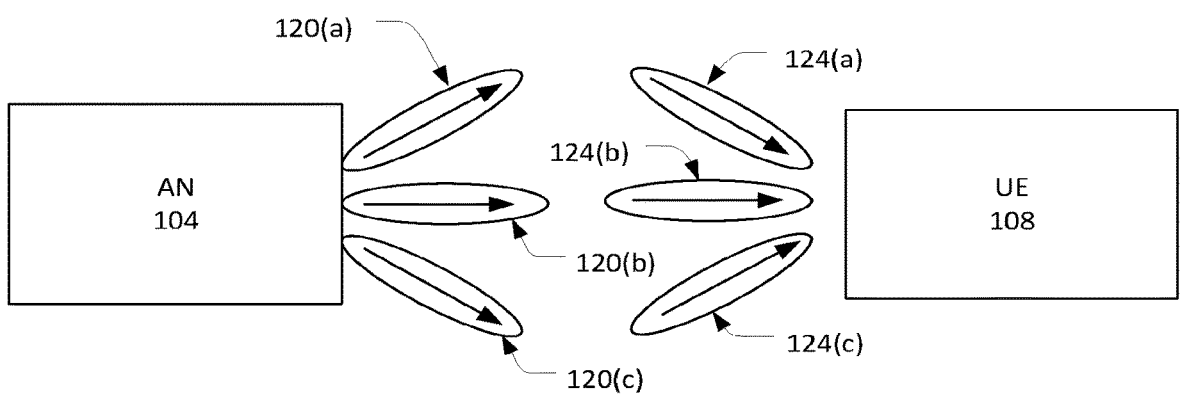

FIGS. 1(a) and 1(b) illustrate wireless communication between an access node ("AN") 104 and a user equipment ("UE") 108 in accordance with various embodiments. FIG. 1(a) illustrates communication in an uplink direction, while FIG. 1(b) illustrates communication in a downlink direction.

The AN 104 may be part of a radio access network ("RAN"). The AN 104 may be referred to as a base station ("BS"), NodeB, evolved NodeB ("eNB"), next generation NodeB ("gNB"), RAN node, Road Side Unit ("RSU"), and so forth, and can comprise a ground station (e.g., a terrestrial access point) or a satellite station providing coverage within a geographic area (for example, a cell). An RSU may refer to any transportation infrastructure entity implemented in or by a gNB/eNB/RAN node or a stationary (or relatively stationary) UE, where an RSU implemented in or by a UE may be referred to as a "UE-type RSU," and an RSU implemented in or by an eNB may be referred to as an "eNB-type RSU."

In some embodiments, the RAN may be a next generation ("NG") radio access network ("RAN"), in which case the AN 104 may be a gNB that communicates with the UE 108 using a new radio ("NR") access technology.

The UE 108 may be any mobile or non-mobile computing device that is connectable to one or more cellular networks. For example, the UE 108 may be a smartphone, a laptop computer, a desktop computer, a vehicular computer, a smart sensor, etc. In some embodiments, the UE 108 may be an Internet of Things ("IoT") UE, which may include a network access layer designed for low-power IoT applications utilizing short-lived UE connections. An IoT UE can utilize technologies such as machine-to-machine ("M2M") or machine-type communications ("MTC") for exchanging data with an MTC server or device via a public land mobile network ("PLMN"), Proximity-Based Service ("ProSe") or device-to-device ("D2D") communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (for example, keep-alive messages, status updates, etc.) to facilitate the connections of the IoT network.

In accordance with some embodiments, the UE 108 can be configured to communicate using Orthogonal Frequency-Division Multiplexing ("OFDM") communication signals with the AN 104 over a multicarrier communication channel in accordance with various communication techniques, such as, but not limited to, an Orthogonal Frequency-Division Multiple Access ("OFDMA") communication technique (for example, for downlink communications) or a Single Carrier Frequency Division Multiple Access ("SC-FDMA") communication technique (for example, for uplink or sidelink communications), although the scope of the embodiments is not limited in this respect. The OFDM signals can comprise a plurality of orthogonal subcarriers.

In some embodiments, a downlink resource grid can be used for downlink transmissions from the AN 104 to the UE 108, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical channels that are conveyed using such resource blocks.

A physical downlink shared channel ("PDSCH") and physical uplink shared channel ("PUSCH") may carry user data and high-layer signaling (for example, radio resource control ("RRC") signaling messages). Physical downlink control channel ("PDCCH") may carry downlink control information about, for example, the transport format and resource allocations related to the PDSCH/PUSCH channel, among other things. A PDCCH may also inform the UE 108 about the transport format, resource allocation, and HARQ (Hybrid Automatic Repeat Request) information related to the PUSCH. A physical uplink control channel ("PUCCH") may carry uplink control information about, for example, HARQ acknowledgement/negative acknowledgement ("ACK/NACK"), multiple-input, multiple-output ("MIMO") feedback such as rank indicator and precoding matrix, channel quality indicators, etc.

The AN 104 and the UE 108 may each engage in beamforming for uplink ("UL") or downlink ("DL") communications. This may be especially beneficial in 5G systems that use high frequency communications, for example, millimeter wave ("mmWave") communications. As used herein, mmWave communications may be communications using a wavelength between 1 and 10 millimeters, which corresponds to a range of frequency spectrum between 30 and 300 gigahertz. Antenna elements used in mmWave systems may be small enough for multiple elements to be implemented in the relatively small form factors typically employed by UEs. Furthermore, beamforming may help to mitigate at least some of the mmWave challenges resulting from, for example, path loss, line-of-sight, and transmission range issues.

For UL communication, beamforming at the UE-side may result in one or more UL transmit ("Tx") beams and beamforming at the AN-side may result in one or more UL receive ("Rx") beams. FIG. 1(a) schematically illustrates three UL Tx beams: UL Tx beam 112(a); UL Tx beam 112(b); and UL Tx beam 112(c). FIG. 1(a) also schematically illustrates three UL Rx beams: UL Rx beam 116(a), UL Rx beam 116(b), and UL Rx beam 116(c). Various embodiments may include different numbers of UL Tx/Rx beams, which may not be equal to one another.

For DL communication, beamforming at the AN-side may result in one or more DL Tx beams and beamforming at the UE-side may result in one or more DL Rx beams. FIG. 1(b) schematically illustrates three DL Tx beams: DL Tx beam 120(a); DL Tx beam 120(b); and DL Tx beam 120(c). FIG. 1(b) also schematically illustrates three DL Rx beams: DL Rx beam 124(a), DL Rx beam 124(b), and DL Rx beam 124(c). Various embodiments may include different numbers of DL Tx/Rx beams, which may not be equal to one another.

A beam management procedure may be performed to determine an appropriate power control on a beam-specific manner. In some embodiments, the AN 104 may configure the UE 108 with one or several power control processes. The AN 104 may use high-layer signaling to provide the configuration information to the UE 108. For example, the AN 104 may transmit one or more RRC signals that include the appropriate configuration information.

Each power control process may be associated with a power control parameter set that includes, for example, a path loss scaling factor, a command to perform a closed-loop PC process, a path loss change variable for triggering PHR, etc. Moreover, each PC process may also be configured with a DL reference signal or a BPL that includes a DL reference signal and an uplink sounding reference signal ("SRS"). As a result, each PC process may be DL-beam-specific or BPL-specific.

A configured set of PC processes may include PC processes based on DL RSs, BPLs, or both DL RSs and BPLs.

DL-Beam-Specific PC

A DL-beam-specific PC process configuration may be based on a DL RS and may be described as follows.

The AN 104 may configure the UE 108 with one or several beam-specific PC processes using high-layer signaling. In some embodiments, the high-layer signaling may be performed as part of an RRC initial configuration phase. Each PC process may include a set of PC-relevant parameters. These parameters may include, but are not limited to, a DL beam-specific path loss scaling factor, for example, $\alpha_c^b$; a DL-beam-specific command to perform a closed-loop PC process, for example, $g[t]_c^b$; and a downlink path loss change parameter to be used to trigger a PHR. Each PC process may be configured with a particular DL RS that is to define the DL beam associated with the PC process. The DL RS may be a beamformed reference signal, for example, the DL RS may be transmitted by DL Tx beam 120(b) of FIG. 1(b).

For each configured PC process, the AN 104 and the UE 108 may individually or collectively perform one or more of the following PC procedures: conduct and signal the closed-loop PC process to obtain a PC value based on the command $g[t]_c^b$ on each beam-specific PC process basis; calculate a path loss estimate, for example, $PL_b^c$, using the configured DL RS of the PC process; and obtain a DL path loss change parameter to be used to trigger PHR from $PL_c^b$ based on the configured DL RS of the PC process. These PC procedures are described in additional detail in, for example, the description related to FIGS. 3 and 4.

The AN 104 may use the results of the PC procedures to determine a DL Tx beam that may increase (for example, maximize) a power of a signal as received by the UE 108. For example, as given by Equation 1, the PHR (e.g., required UL transmission power for PUSCH) may depend on the beam index b. The AN 104 may select the beam index $b_{opt}$ that leads to a minimum required UL transmission power, for example, PHR. This can help to reduce the UE power consumption. And as shown in Equation 1, the beam index leading to minimum PHR may correspond to the beam experiencing the smallest path loss. Upon determining the desired DL Tx beam, the AN 104 may signal this DL Tx beam to the UE 108, which may use the information to determine an UL Tx beam and a DL Rx beam to be used by the UE 108 as follows.

The DL-beam-specific PC process may utilize reciprocity-based UL Tx and Rx beamforming. Due to the absence of explicit UL beamforming signaling, reciprocity-based UL Tx beamforming may be performed by the UE 108. As such, the UE 108 may employ the DL Rx beam that can maximize a receive power for a configured DL RS as the UL Tx beam. For example, if the DL Rx beam 124(b) maximizes a receive power for a configured DL RS (transmitted by DL Tx beam 120(b)), the UE 108 may also determine that the UL Tx beam 112(b), which corresponds to the DL Rx beam 124(b) is to be used for UL transmissions. Moreover, the reciprocity-based UL Rx beamforming may also be performed by the AN 104, which may apply the DL Tx beam associated with the configured DL RS for the UL Rx beam. For example, if the AN 104 determines that DL Tx beam 120(b) is to be used for downlink transmissions, it may use corresponding UL Rx beam 116(b) for receiving uplink transmission.

The DL RS-based beam-specific PC may utilize implicit UL Tx beam signaling. As previously discussed, the uplink beam selection may not be explicitly signaled by the AN 104 to the UE 108. Thus, the reciprocity-based UL Tx beamforming may be assumed by the AN 104, whereby the DL Rx beam may be reused for the UL Tx beam at the UE 108.

As a result, the downlink transmit beam may be explicitly or implicitly signaled by the AN 104 to the UE 108 during uplink data scheduling. Two approaches may be employed for the DL beam signaling.

In the first approach, which may be referred to as an implicit approach, each downlink control channel resource set ("CORESET"), which includes multiple PDCCH candidates for downlink and uplink data assignments, may be configured with a quasi-co-located ("QCL") DL RS. All the PDCCH candidates in the CORESET may be transmitted by using the downlink beam associated with the configured QCL DL RS. When a PUSCH is scheduled by a PDCCH, the downlink beam used by the PDCCH is known to the UE 108. The UE 108 may then use an UL Tx beam that corresponds to the optimum DL Rx beam, used for the PDCCH reception, for the scheduled PUSCH.

For example, the AN 104 may transmit an indication of a QCL relationship between CORESET #1 and DL RS #1 (transmitted by DL Tx beam 120(b)). If the UE 108 detects a PDCCH of CORESET #1 that schedules DL or UL data assignment, the UE 108 may use a DL Rx beam or UL Tx beam that corresponds to the DL Tx beam 120(b) for the following communication. If the detected PDCCH schedules a DL data assignment, the UE 108 may utilize DL Rx beam 124(b), which corresponds to the DL Tx beam 120(b), to receive the DL data. If the PDCCH schedules an UL data assignment, in a PUSCH, for example, the UE 108 may utilize UL Tx beam 112(b), which corresponds to the DL Tx beam 120(b), to transmit the UL data in the UL data assignment.

In the second approach employed for downlink beam signaling, which may be referred to as an explicit approach, a particular beam-specific PC process index in the configured set of beam-specific PC processes described above may be signaled in the uplink data scheduling information. Based on the downlink beam associated with the signaled PC process, the UE 108 may determine the UL transmission beam by virtue of reciprocity-based beamforming. For example, the PDCCH may include an uplink data assignment that includes an indication of a first PC process that corresponds to a DL RS transmitted by DL Tx beam 120(b). The UE 108 may then determine that the scheduled PUSCH is to be transmitted using UL Tx beam 112(b), which corresponds to DL Tx beam 120(b). Transmission power may be calculated by using the closed-loop PC process associated with the signaled PC process.

Thus, the AN 104 may use implicit or explicit signaling to communicate the desired DL Tx beam used for downlink communications. The UE 108 may then determine the desired DL Rx beam or the desired UL Tx beam based on the signaled DL Tx beam. Further, the AN 104 may also determine a desired UL Rx beam for receiving UL communications based on the desired DL Tx beam.

In some embodiments, the DL-beam-specific PC may utilize a beam-specific PHR calculation. The beam-specific PHR calculation may be obtained as follows:

$$PH_c^b[t] = P_{CMAX,c}^b - \{P_{0,PUSCH} + \alpha_c^b PL_c^b + g[t]_c^b\}, \quad \text{Equation (2)}$$

where $PH_c^b[t]$ is the calculated power headroom value for beam b in cell c and $P_{CMAX,c}^b$ is the maximum UE transmission power for beam b in cell c. The maximum UE transmission power may explicitly take into account an effect of off-boresight main beam in case of UE antenna rotation. For example, if an antenna array of the UE 108 is rotating, but the UE 108 wants to focus on a fixed beam, the UE 108 may apply different beamforming weights to account for the fact that the beamforming direction is not the same as the boresight direction of the antenna array. The maximum transmission power in the off-boresight direction may be smaller than the maximum transmission power in the boresight direction, even though the maximum output power of the power amplifier of the UE 108 does not change. As discussed above, the path loss estimate, $PL_c^b$, and the downlink path loss change parameter may be calculated from the configured downlink reference signal of the PC process.

In some embodiments, the UE 108 may transmit the calculated power headroom value to the AN 104 in a PHR.

BPL-Specific PC A BPL-specific PC process configuration may be based on a BPL and may be described as follows.

Similar to the DL-beam-specific PC process, the BPL-specific PC process may include the AN 104 configuring the UE 108 with one or several PC processes using high-layer signaling (for example, RRC signaling that may, for example, be part of an RRC initial configuration). Each PC process may be configured with a particular BPL that includes a DL RS index and an UL SRS index that define the DL and UL beams associated with the PC process, respectively. For each configured PC process, the AN 104 and the UE 108 may individually or collectively perform one or more of the following PC procedures: conduct and signal a closed-loop PC process to obtain a PC value based on the command, $g[t]_c^b$, on a BPL-specific PC process basis; calculate a path loss estimate, for example, $PL_c^b$, using the configured DL RS in the configured BPL of the PC process; and obtain a DL path loss change parameter to be used to trigger PHR from $PL_c^b$ based on the DL RS in the configured BPL of the PC process.

The BPL-specific PC process may utilize UL Tx beam determination as follows. The AN 104 may explicitly or implicitly signal the UL Tx beam to the UE during the uplink data scheduling, for example, when the AN 104 schedules a PUSCH data transmission. The following two approaches can be employed for signaling the UL Tx beam in this scenario. In the first approach, which may be referred to as an implicit approach, each DL CORESET, which includes multiple PDCCH candidates for DL and UL data assignment, may be configured with a QCL BPL including a DL RS index and an UL SRS index. All the PDCCH candidates in the CORESET may be transmitted by using the DL RS associated with the configured QCL DL RS. When a PUSCH is scheduled by a PDCCH, the UL transmit beam used by the PUSCH shall be the UL beam associated with the configured UL SRS index.

In the second approach, which may be referred to as an explicit approach, an index of a BPL-specific-PC process of the configured set of BPL-specific PC processes may be signaled in the uplink data scheduling information. Based on the UL beam associated with the signaled BPL-specific PC process, the UE can determine the UL Tx beam for the PUSCH, and transmission power can be calculated by using the closed-loop PC process associated with the signaled BPL-specific PC process as well.

Hybrid DL-Beam-Specific and BPL-Specific PC

In some embodiments, the AN 104 may configure the UE 108 with a plurality of PC processes, with at least one PC process being DL-beam-specific and another PC process being BPL-specific. The DL-beam-specific PC processes may utilize approaches described above with respect to the DL-beam-specific PC for PC relevant functions. The BPL-specific PC processes may utilize approaches described above with respect to the BPL-specific PC processes for PC relevant procedures.

Figure 2:
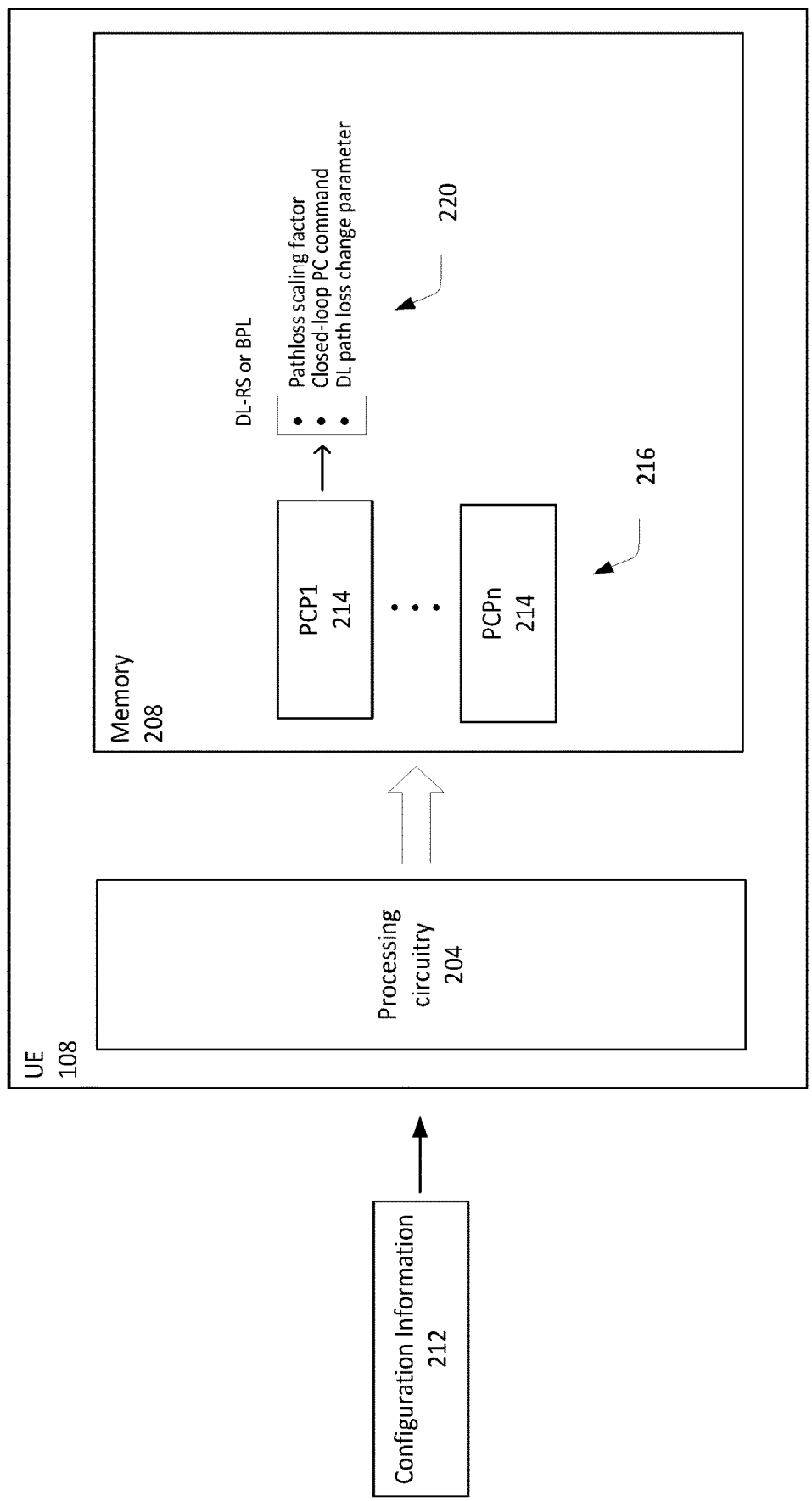
FIG. 2 illustrates components of a user equipment involved in a configuration operation in accordance with some embodiments.

FIG. 2 illustrates components of the UE 108 in a configuration operation in accordance with some embodiments. The UE 108 may include processing circuitry 204 coupled with memory 208, as will be described in further detail in later embodiments (for example, in the description related to FIGS. 6, 7, 8, and 12). The processing circuitry 204 may receive configuration information 212. The configuration information 212 may be received from the AN 104 through, for example, RRC signaling. The processing circuitry 204 may process the configuration information 212 in order to determine and store PC process (PCP) information 216 in the memory 208. The PCP information 216 may configure one or more PCPs.

Each of the configured PCPs may be associated with a PC parameter set 220. As shown, the PC parameter set 220 may include a path loss scaling factor, a command to perform a closed-loop PC process, and a DL path loss change parameter. Furthermore, each PC parameter set 220 may be associated with a DL RS or a BPL. For example, the PC parameter set 220 may an indication of a DL RS that defines a downlink beam associated with PCP1 214, or an indication of a BPL that includes the DL RS and an UL SRS. The indication of the DL RS may be an index of the DL RS. The indication of the BPL may be an index of the BPL or an index of the DL RS and an index of the UL SRS.

In some embodiments, individual PCPs may be referenced by an index that corresponds to the PCP itself, the DL RS, the UL SRS, or the BPL.

Figure 3:
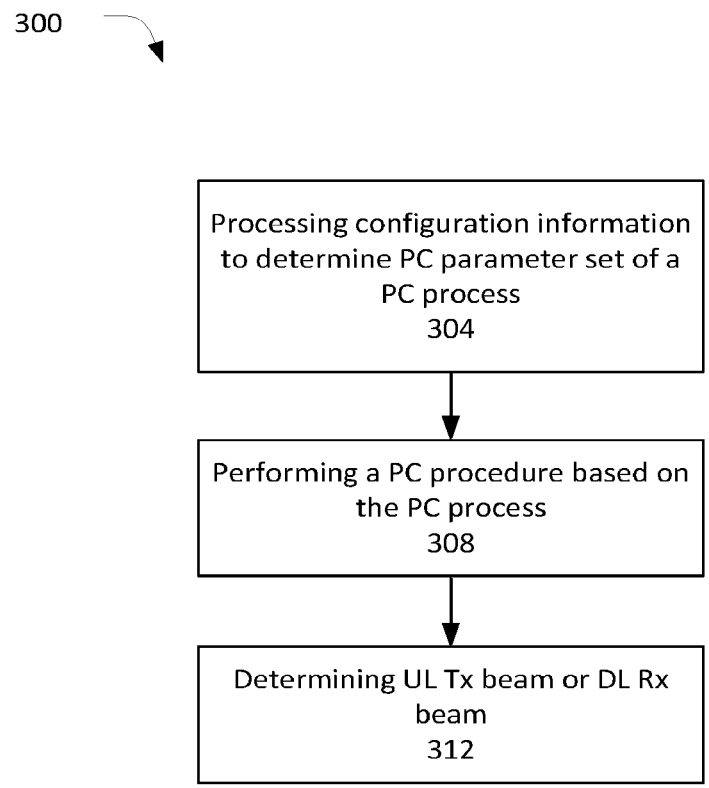
FIG. 3 illustrates an example operation flow/algorithmic structure in accordance with some embodiments.

FIG. 3 illustrates an operation flow/algorithmic structure 300 in accordance with some embodiments. The operation flow/algorithmic structure 300 may be performed by the UE 108 or circuitry therein in accordance with various embodiments.

The operation flow/algorithmic structure 300 may include, at 304, processing configuration information to determine a PC parameter set of a PC process. As described above, the configuration information may be received by the UE 108 from the AN 104 through RRC signaling. The configuration information may configure a plurality of PC processes, with each of the PC processes having a corresponding PC parameter set and being associated with a DL RS or a BPL.

In some embodiments, the PC parameter set of a particular PC process may include, but is not limited to, a path loss scaling factor, a command to perform a closed-loop PC process, a downlink path loss change parameter to be used to trigger a PHR, etc.

The operation flow/algorithmic structure 300 may further include, at 308, performing a PC procedure based on the PC process.

In some embodiments, the PC procedure is one or more operations associated with a closed-loop PC process. For example, the PC parameter set may include a command to send an uplink transmission using a subframe, beam, and cell provided in the command. The UE 108 may utilize the beam to transmit an uplink signal at the designated subframe in the designated cell. The AN 104 may determine a PC value based on the uplink signal. For example, the AN 104 may measure a received power of the uplink transmission and compare the measurement to a threshold to determine whether the transmit power should be increased, be decreased, or stay the same. If the transmit power needs to be changed, for example, increased or decreased, the AN 104 may send an appropriate PC command to the UE 108. Upon receiving the PC command, the UE 108 may adjust its transmit power for uplink transmissions.

In some embodiments, the PC procedure may include one or more operations associated with a PHR. For example, the UE 108 may calculate a path loss estimate using a configured DL RS of a PC process (e.g., the UE 108 may continuously estimate path loss based on receive power of the configured DL RS of the respective PC process). The UE 108 may track the path loss estimate to determine whether it changes by a certain magnitude. For example, the UE 108 may compare a change in the path loss estimate to the DL path loss change parameter and may use this comparison as a basis for a PHR trigger. For example, if the calculated change in the path loss estimate is greater than the DL path loss change parameter, the UE 108 may generate and send a PHR to the AN 104.

In some embodiments, when a PHR is triggered, the UE 108 may perform a beam-specific PHR calculation as described above with respect to Equation 2 to determine a power headroom value. The power headroom value may be transmitted to the AN 104 in the PHR. The operation flow/algorithmic structure 300 may further include, at 312, determining a UL Tx beam or a DL Rx beam. As discussed above, the determination of the UL Tx beam and the DL Rx beam may be based on a DL Tx beam or UL Tx beam that is signaled, implicitly or explicitly, to the UE 108 by the AN 104.

Figure 4:
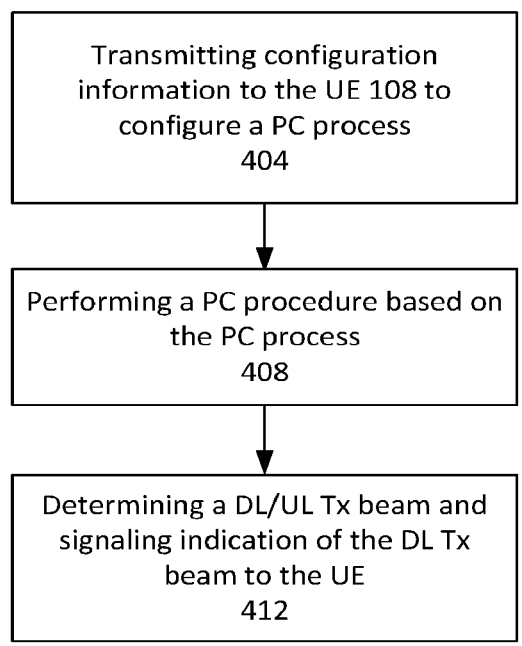
FIG. 4 illustrates an example operation flow/algorithmic structure in accordance with some embodiments.

FIG. 4 illustrates an operation flow/algorithmic structure 400 in accordance with some embodiments. The operation flow/algorithmic structure 400 may be performed by the AN 104 or circuitry therein in accordance with various embodiments.

The operation flow/algorithmic structure 400 may include, at 404, transmitting configuration information to the UE 108 to configure a PC process. The configuration information may be transmitted to the UE 108 using RRC signaling. In some embodiments, the configuration information may be transmitted in an RRC initial configuration phase, for example, in an RRC connection reconfiguration message that serves as a command to create or modify an RRC connection. In some embodiments, a plurality of PC processes may be configured by the AN 104 transmitting configuration information in one or more configuration messages.

The operation flow/algorithmic structure 400 may further include, at 408, performing a PC procedure based on the PC process. For example, the AN 104 may engage in a closed-loop PC process by receiving and measuring a received power of an uplink signal and comparing the measurement to a threshold to determine whether the transmit power at the UE 108 should be increased, be decreased, or stay the same. If it is determined that the transmission power should be changed, the AN 104 may generate and transmit an appropriate PC command to the UE 108 to adjust its transmit power.

In some embodiments, the AN 104 may determine whether the transmit power should be increased, decreased or stay the same based on a PHR received from the UE 108.

The operation flow/algorithmic structure 400 may further include, at 412, determining a DL/UL Tx beam and signaling an indication of the DL/UL Tx beam to the UE 108. In some embodiments, the DL/UL Tx beam may be determined based on, or in conjunction with, the PC procedures. The AN 104 may signal the indication of the DL/UL Tx beam to the UE 108 using implicit or explicit signaling as described above.

Figure 5:
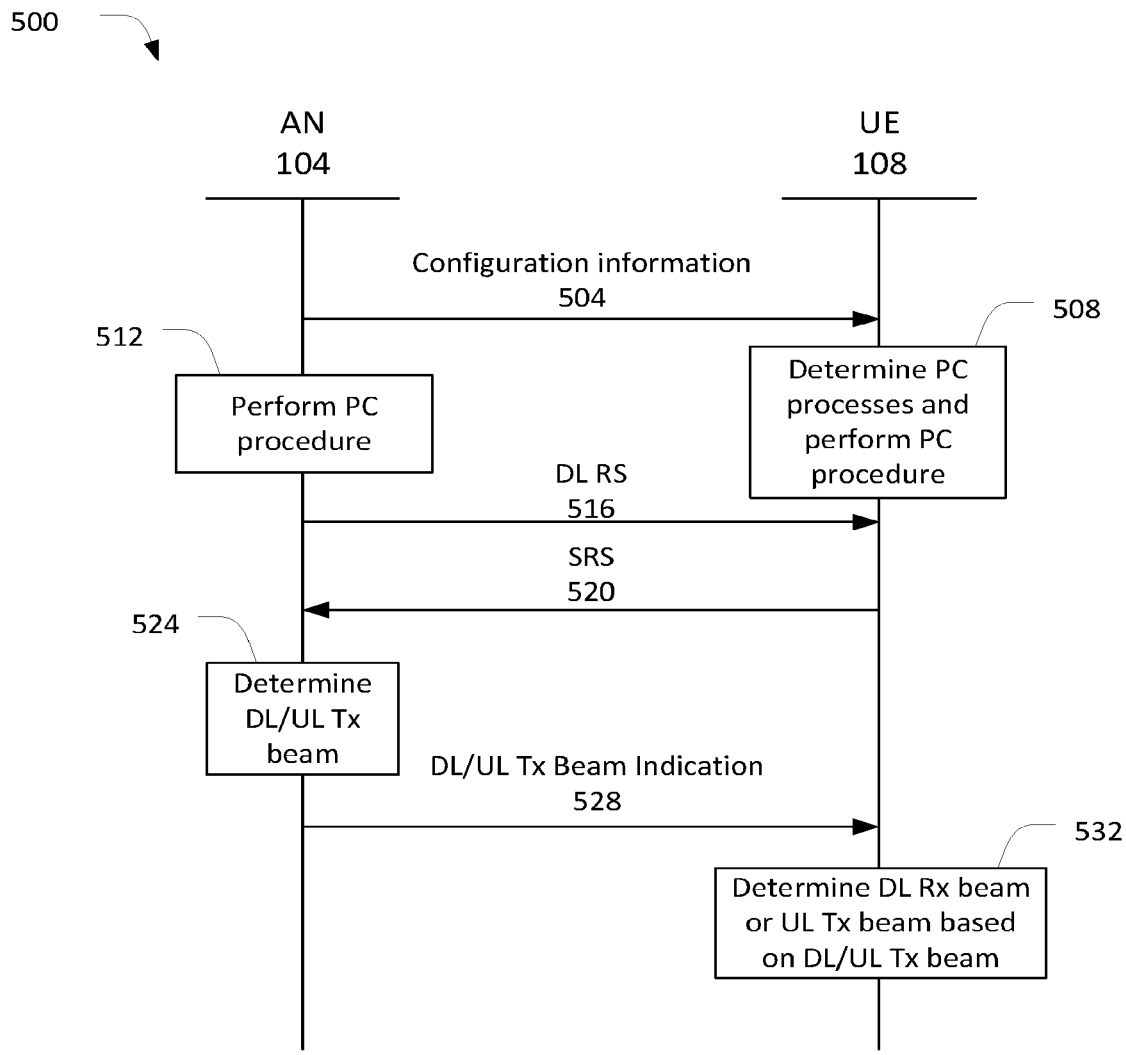
FIG. 5 illustrates a message flow in accordance with some embodiments.

FIG. 5 illustrates a message flow diagram 500 that describes a specific signaling exchange that may be used to perform or facilitate these PC procedures in accordance with some embodiments.

The message flow diagram 500 may include, at 504, the AN 104 transmitting configuration information to the UE 108. The configuration information may be transmitted to the UE and one or more configuration messages using, for example, RRC signaling.

The message flow diagram 500 may further include, at 508, the UE 108 determining PC processes and performing one or more PC procedures for individual configured PC processes.

The message flow diagram 500 may further include, at 512, the AN 104 performing a PC procedure. The performing of the PC procedure may be based on a triggering event (e.g., transmitting an uplink signal for closed-loop PC process based on a command) or a path loss estimate changing greater than a predetermined amount.

In some embodiments, the PC procedures may be based on UL/DL reference signals including, for example, DL RS 516 transmitted by the AN 104 and an UL SRS 520 transmitted by the UE 108.

At 524, the AN 104 may determine a DL/UL Tx beam. The AN 104 may then transmit an indication of the DL/UL Tx beam to the UE 108 at 528. The indication of the DL/UL Tx beam may be implicitly or explicitly signaled as described above.

At 532, the UE 108 may determine a DL Rx beam or an UL Tx beam, as needed, based on the DL/UL Tx beam indicated by the message at 528.

Figure 6:
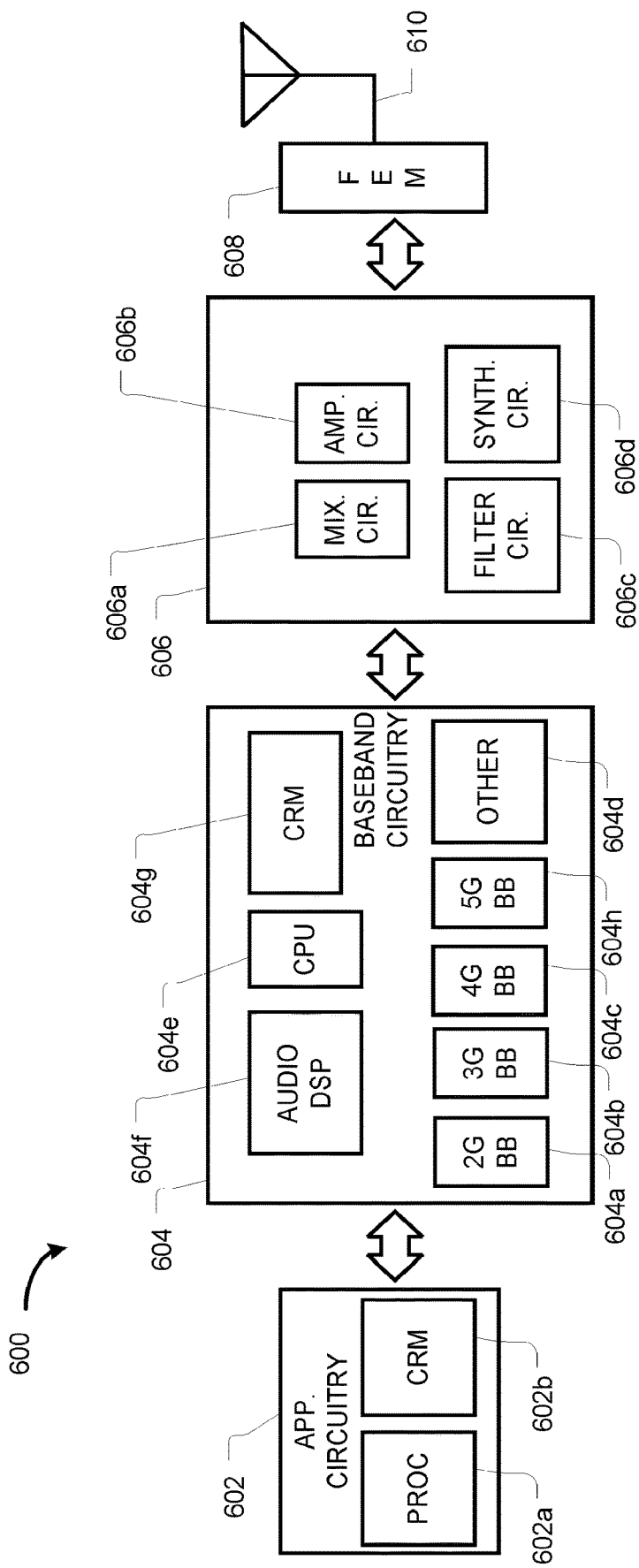
FIG. 6 illustrates an electronic device in accordance with some embodiments.

Embodiments described herein may be implemented into a system using any suitably configured hardware and/or software. FIG. 6 illustrates, for one embodiment, example components of an electronic device 600. In embodiments, the electronic device 600 may be, implement, be incorporated into, or otherwise be a part of the AN 104 or the UE 108, or a computer device that may perform, implement, or incorporate one or more of the features of the AN 104 or the UE 108.

In some embodiments, the electronic device 600 may include application circuitry 602, baseband circuitry 604, radio frequency ("RF") circuitry 606, front-end module ("FEM") circuitry 608 and one or more antennas 610, coupled together at least as shown. In embodiments where the electronic device 600 is implemented in or by the AN 104, the electronic device 600 may also include network interface circuitry (not shown) for communicating over a wired interface (for example, an X2 interface, an S1 interface, and the like).

As used herein, the term "circuitry" may refer to, be part of, or include an Application Specific Integrated Circuit ("ASIC"), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The application circuitry 602 may include one or more application processors. For example, the application circuitry 602 may include circuitry such as, but not limited to, one or more single-core or multi-core processors 602a. The processor(s) 602a may include any combination of generalpurpose processors and dedicated processors (for example, graphics processors, application processors, etc.). The processors 602a may be coupled with or may include computer-readable media 602b (also referred to as "CRM 602b," "memory 602b," "storage 602b," or "memory/storage 602b") and may be configured to execute instructions stored in the CRM 602b to enable various applications and/or operating systems to run on the system.

The baseband circuitry 604 may include circuitry such as, but not limited to, one or more single-core or multi-core processors to perform any of the beam management procedures described herein. In some embodiments, the baseband circuitry 604 may be configured to perform one or more processes, techniques, and/or methods as described herein, or portions thereof. For example, the baseband circuitry 604 may construct, process, or cause signaling of the various messages described and discussed in the message flow diagram 500 of FIG. 5. Furthermore, the baseband circuitry 604 may implement the operation flow/algorithmic structure 300 of FIG. 3 or the operation flow/algorithmic structure 400 of FIG. 4 according to some embodiments.

The baseband circuitry 604 may include one or more baseband processors and/or control logic to process baseband signals received from a receive signal path of the RF circuitry 606 and to generate baseband signals for a transmit signal path of the RF circuitry 606. Baseband circuitry 604 may interface with the application circuitry 602 for generation and processing of the baseband signals and for controlling operations of the RF circuitry 606. For example, in some embodiments, the baseband circuitry 604 may include a second generation ("2G") baseband processor 604a, third generation ("3G") baseband processor 604b, fourth generation ("4G") baseband processor 604c, fifth generation ("5G") baseband processor 604h, or other baseband processor(s) 604d for other existing generations, generations in development or to be developed in the future (for example, 6G, etc.).

The processing circuitry 204 may correspond to central processing unit ("CPU") 604e, 5G baseband processor 604h, etc.

The baseband circuitry 604 (for example, one or more of baseband processors 604a-d, h) may handle various radio control functions that enable communication with one or more radio networks via the RF circuitry 606. The radio control functions may include, but are not limited to, signal modulation/demodulation, encoding/decoding, radio-frequency shifting, and the like. In some embodiments, modulation/demodulation circuitry of the baseband circuitry 604 may include Fast-Fourier Transform ("FFT"), precoding, and/or constellation mapping/demapping functionality. In some embodiments, encoding/decoding circuitry of the baseband circuitry 604 may include convolution, tail-biting convolution, turbo, Viterbi, and/or Low Density Parity Check ("LDPC") encoder/decoder functionality. Embodiments of modulation/demodulation and encoder/decoder functionality are not limited to these examples and may include other suitable functionality in other embodiments.

In some embodiments, the baseband circuitry 604 may include elements of a protocol stack such as, for example, elements of an evolved universal terrestrial radio access network ("E-UTRAN") or NG RAN protocol including, for example, physical ("PHY"), media access control ("MAC"), radio link control ("RLC"), packet data convergence protocol ("PDCP"), and/or RRC elements. A central processing unit ("CPU") 604e of the baseband circuitry 604 may be configured to run elements of the protocol stack for signaling of the PHY, MAC, RLC, PDCP and/or RRC layers.

In various embodiments, the 5G baseband processor 604h may perform the PHY and possibly some or all of the MAC layer operations described above with respect to FIGS. 1-5; while the CPU 604e may perform some or all of the MAC layer operations and the RLC, PDCP, and RRC layer operations above with respect to FIGS. 1-5. In some embodiments, the CPU 604e may configure, at the RRC layer, for example, the various PC process sets that may be used for PC procedures, while the 5G baseband circuitry 604h may be used to perform the process, construct, or signal the configuration information, the indications of the DL/UL beams, and power control commands. The CPU 604e and 5G baseband circuitry 604h may individually or collectively perform the PC procedures described herein.

In some embodiments, the baseband circuitry 604 may include one or more audio digital signal processor(s) ("DSP(s)") 604f. The audio DSP(s) 604f may include elements for compression/decompression and echo cancellation and may include other suitable processing elements in other embodiments.

The baseband circuitry 604 may further include computer-readable media 604g (also referred to as "CRM 604g," "memory 604g," or "storage 604g"). The CRM 604g may be used to load and store data or instructions for operations performed by the processors of the baseband circuitry 604. For example, the CRM 604g may include instructions that, when executed by one or more processors, cause a device (for example, the AN 104 or UE 108) to perform any of the operations described herein. The CRM 604g may also include data stored to facilitate the operations (and may correspond to memory 208). For example, the CRM 604g may store PCP parameter sets. CRM 604g for one embodiment may include any combination of suitable volatile memory or non-volatile memory. The CRM 604g may include any combination of various levels of memory/storage, including, but not limited to, read-only memory ("ROM") having embedded software instructions (for example, firmware), random access memory (for example, dynamic random access memory ("DRAM")), cache, buffers, etc. The CRM 604g may be shared among the various processors or dedicated to particular processors.

Components of the baseband circuitry 604 may be suitably combined in a single chip or a single chipset, or disposed on a same circuit board in some embodiments. In some embodiments, some or all of the constituent components of the baseband circuitry 604 and the application circuitry 602 may be implemented together, such as, for example, on a system on a chip ("SOC").

In some embodiments, the baseband circuitry 604 may provide for communication compatible with one or more radio technologies. For example, in some embodiments, the baseband circuitry 604 may support communication with an E-UTRAN and/or other wireless metropolitan area networks ("WMAN"), a wireless local area network ("WLAN"), a wireless personal area network ("WPAN"). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc., to facilitate the communication with the wireless network. RF circuitry 606 may include a receive signal path that may include circuitry to down-convert RF signals received from the FEM circuitry 608 and provide baseband signals to the baseband circuitry 604. RF circuitry 606 may also include a transmit signal path that may include circuitry to up-convert baseband signals provided by the baseband circuitry 604 and provide RF output signals to the FEM circuitry 608 for transmission.

In some embodiments, the RF circuitry 606 may include a receive signal path and a transmit signal path. The transmit and receive signal paths of the RF circuitry 606 may include mixer circuitry 606a, amplifier circuitry 606b, and filter circuitry 606c. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. In the receive path, the amplifier circuitry 606b may be configured to amplify the down-converted signals and the filter circuitry 606c may be a low-pass filter ("LPF") or band-pass filter ("BPF") configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement.

In the transmit path, the amplifier circuitry 606b may include a power amplifier that is to amplify an upconverted signal for transmission. The amplifier circuitry 606b may be controlled by the baseband circuitry 604 to transmit the signals at a power that results from various of the PC procedures described herein.

In some embodiments, mixer circuitry 606a of the receive signal path may comprise passive mixers, although the scope of the embodiments is not limited in this respect. In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c. The filter circuitry 606c may include an LPF, although the scope of the embodiments is not limited in this respect.

In some embodiments, the mixer circuitry 606a of the receive signal path and the mixer circuitry 606a of the transmit signal path may include two or more mixers and may be arranged for quadrature downconversion and/or upconversion, respectively. In some embodiments, the mixer circuitry 606a of the receive signal path and the mixer circuitry 606a of the transmit signal path may include two or more mixers and may be arranged for image rejection (for example, Hartley image rejection). In some embodiments, the mixer circuitry 606a of the receive signal path and the mixer circuitry 606a of the transmit signal path may be arranged for direct downconversion and/or direct upconversion, respectively. In some embodiments, the mixer circuitry 606a of the receive signal path and the mixer circuitry 606a of the transmit signal path may be configured for superheterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter ("ADC") and digital-to-analog converter ("DAC") circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect, as other types of frequency synthesizers may be suitable. For example, synthesizer circuitry 606d may be a delta-sigma synthesizer, a frequency multiplier, or a synthesizer comprising a phase-locked loop with a frequency divider. The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator ("VCO"), although that is not a requirement. Divider control input may be provided by either the baseband circuitry 604 or the application circuitry 602 depending on the desired output frequency. In some embodiments, a divider control input (for example, N) may be determined from a look-up table based on a channel indicated by the application circuitry 602.

Synthesizer circuitry 606d of the RF circuitry 606 may include a divider, a delay-locked loop ("DLL"), a multiplexer and a phase accumulator. In some embodiments, the divider may be a dual modulus divider ("DMD") and the phase accumulator may be a digital phase accumulator ("DPA"). In some embodiments, the DMD may be configured to divide the input signal by either N or N+1 (for example, based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (for example, twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ("fLO"). In some embodiments, the RF circuitry 606 may include an IQ/polar converter.

FEM circuitry 608 may include a receive signal path that may include circuitry configured to operate on RF signals received from one or more antennas 610, amplify the received signals and provide the amplified versions of the received signals to the RF circuitry 606 for further processing. FEM circuitry 608 may also include a transmit signal path that may include circuitry configured to amplify signals for transmission provided by the RF circuitry 606 for transmission by one or more of the one or more antennas 610. In some embodiments, the FEM circuitry 608 may include a Tx/Rx switch to switch between transmit mode and receive mode operation. The FEM circuitry 608 may include a receive signal path and a transmit signal path. The receive signal path of the FEM circuitry 608 may include a low-noise amplifier ("LNA") to amplify received RF signals and provide the amplified received RF signals as an output (for example, to the RF circuitry 606). The transmit signal path of the FEM circuitry 608 may include a power amplifier ("PA") to amplify input RF signals (for example, provided by RF circuitry 606), and one or more filters to generate RF signals for subsequent transmission (for example, by one or more of the one or more antennas 610).

In some embodiments, the electronic device 600 may include additional elements such as, for example, a display, a camera, one or more sensors, and/or interface circuitry (for example, input/output ("I/O") interfaces or buses) (not shown). In embodiments where the electronic device 600 is implemented in or by the AN 104, the electronic device 600 may include network interface circuitry. The network interface circuitry may be one or more computer hardware components that connect electronic device 600 to one or more network elements, such as one or more servers within a core network or one or more other eNBs via a wired connection. To this end, the network interface circuitry may include one or more dedicated processors and/or field programmable gate arrays ("FPGAs") to communicate using one or more network communications protocols such as X2 application protocol ("AP"), S1 AP, Stream Control Transmission Protocol ("SCTP"), Ethernet, Point-to-Point, Fiber Distributed Data Interface ("FDDI"), and/or any other suitable network communications protocols.

Figure 7:
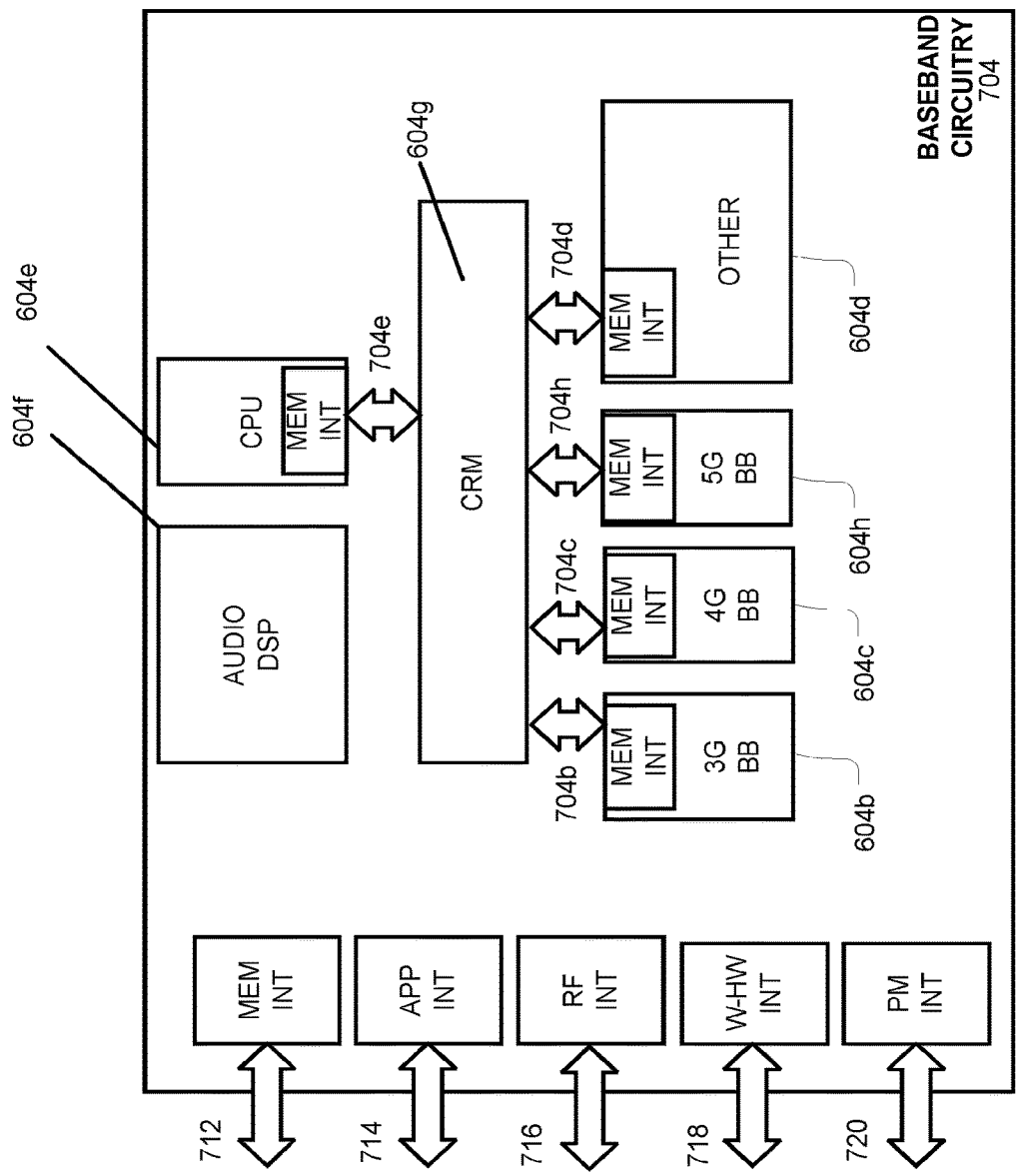
FIG. 7 illustrates baseband circuitry in accordance with some embodiments.

FIG. 7 illustrates example interfaces of baseband circuitry 704 in accordance with some embodiments. As discussed above, the baseband circuitry 604 of FIG. 6 may comprise processors and CRM 604g utilized by said processors. Each of the processors 604b, 604c, 604h, 604d, and 604e may include a memory interface, 704b, 704c, 704h, 704d, and 704e respectively, to send/receive data to/from the CRM 604g.

Figure 8:
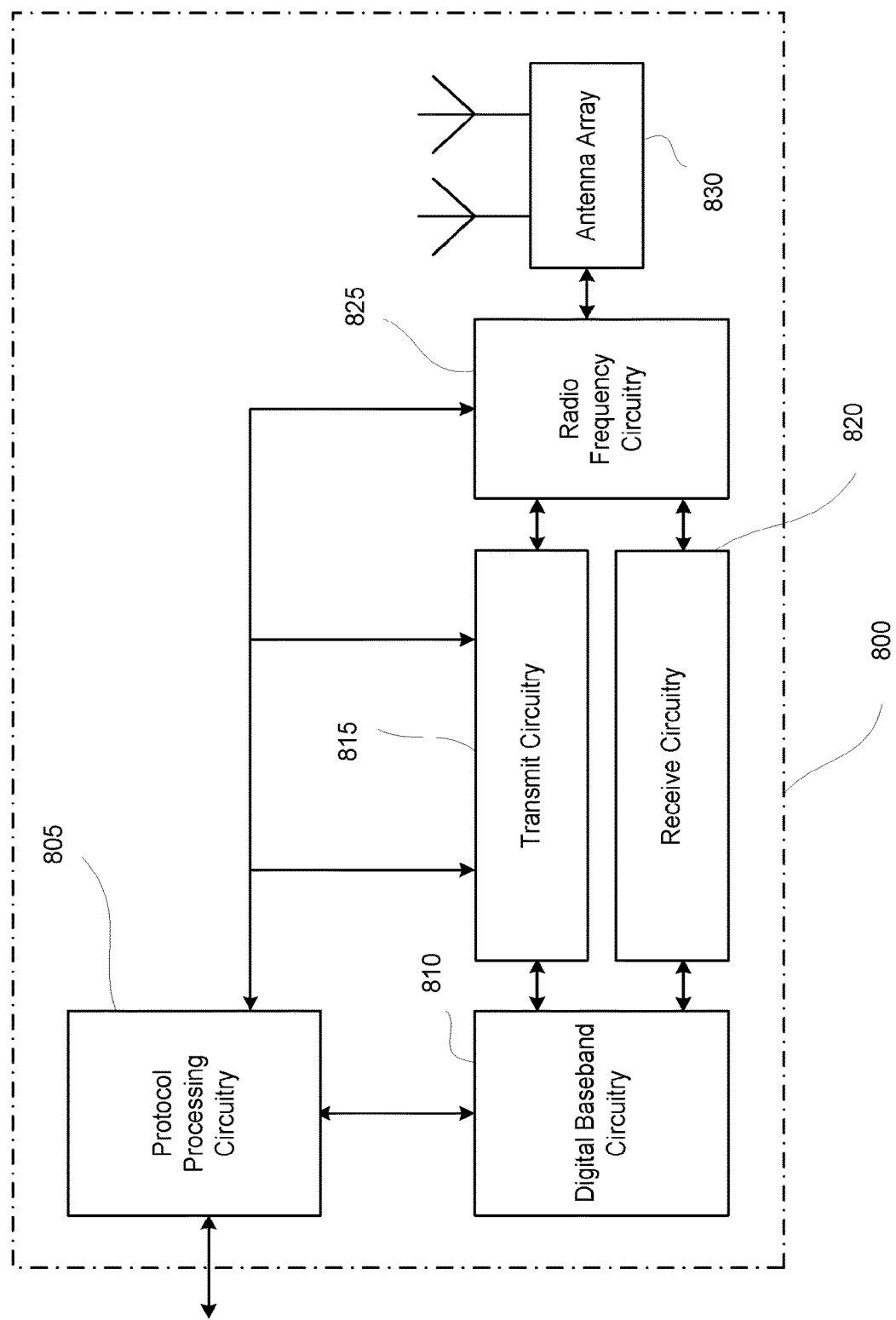
FIG. 8 illustrates communication circuitry in accordance with some embodiments.

The baseband circuitry 604 may further include one or more interfaces to communicatively couple to other circuitries/devices, such as a memory interface 712 (for example, an interface to send/receive data to/from memory external to the baseband circuitry 604), an application circuitry interface 714 (for example, an interface to send/receive data to/from the application circuitry 602 of FIG. 6), an RF circuitry interface 716 (for example, an interface to send/receive data to/from RF circuitry 606 of FIG. 6), a wireless hardware connectivity interface 718 (for example, an interface to send/receive data to/from Near Field Communication ("NFC") components, Bluetooth® components (for example, Bluetooth® Low Energy), Wi-Fi® components, and other communication components), and a power management interface 720 (for example, an interface to send/receive power or control signals to/from a power management controller. FIG. 8 illustrates communication circuitry 800 according to some aspects.

Communication circuitry 800 may be similar to, and substantially interchangeable with, components of electronic device 600. Components as shown in communication circuitry 800 are shown here for illustrative purposes and may include other components not shown here in FIG. 8.

Communication circuitry 800 may include protocol processing circuitry 805, which may correspond to CPU 604e, processor 602a, etc. The protocol processing circuitry may implement one or more of MAC, RLC, PDCP, RRC and non-access stratum ("NAS") functions. Protocol processing circuitry 805 may include one or more processing cores (not shown, but similar to those described elsewhere herein) to execute instructions and one or more memory structures (not shown, but similar to those described elsewhere herein) to store program and data information.

Communication circuitry 800 may further include digital baseband circuitry 810, which may be similar to baseband processors of the baseband circuitry 604. The digital baseband circuitry 810 may implement PHY layer functions including one or more of hybrid automatic repeat request ("HARQ") functions; scrambling and/or descrambling; coding and/or decoding; layer mapping and/or demapping; modulation symbol mapping; received symbol and/or bit metric determination; multi-antenna port precoding and/or decoding, which may include one or more of space-time, space-frequency or spatial coding; reference signal generation and/or detection; preamble sequence generation and/or decoding; synchronization sequence generation and/or detection; control channel signal blind decoding; and other related functions.

Communication circuitry 800 may further include transmit circuitry 815, receive circuitry 820 and/or antenna array 830.

Communication circuitry 800 may further include RF circuitry 825, which may correspond to RF circuitry 606 or FEM circuitry 608. In an aspect of the invention, RF circuitry 825 may include multiple parallel RF chains for one or more of transmit or receive functions, each connected to one or more antennas of the antenna array 830.

In an aspect of the disclosure, protocol processing circuitry 805 may include one or more instances of control circuitry (not shown) to provide control functions for one or more of digital baseband circuitry 810, transmit circuitry 815, receive circuitry 820, and/or radio frequency circuitry 825.

In some embodiments, communication circuitry 800 may be specifically configured for mmWave communications. For example, the communication circuitry 800 may have a hybrid beamforming architecture in which precoding and combining are done in both baseband and RF sections. For example, the digital baseband circuitry 810 may implement a baseband precoder (in transmitter) and combiner (in receiver) using digital signal processing, while RF circuitry 825 may implement RF precoding (in transmitter) and combiner (in receiver) using phase shifters.

Figure 9:
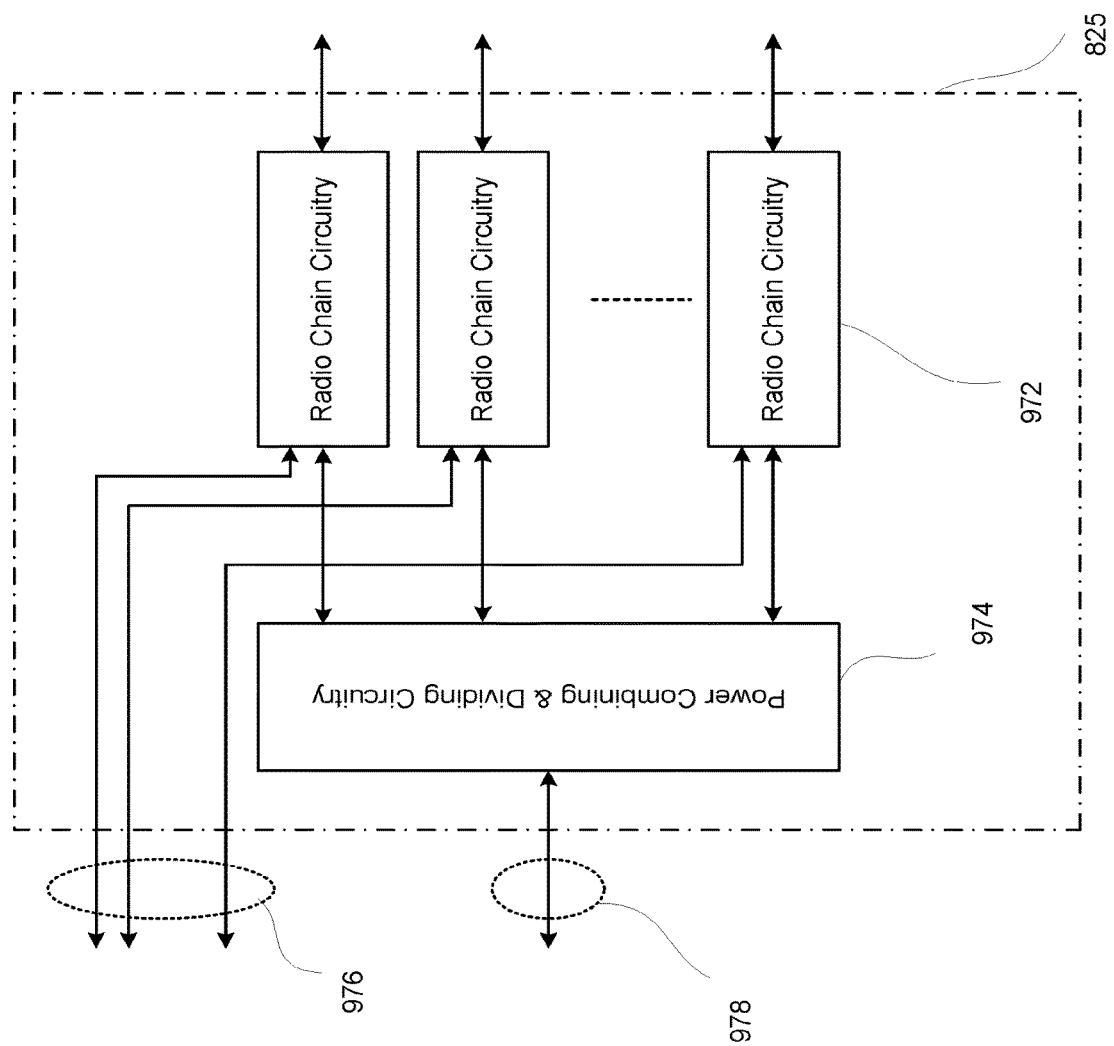
FIG. 9 illustrates radio-frequency circuitry in accordance with some embodiments.

FIG. 9 illustrates the exemplary radio-frequency circuitry 825 in more detail according to some embodiments.

RF circuitry 825 may include one or more instances of radio chain circuitry 972, which in some aspects may include one or more filters, power amplifiers, low-noise amplifiers, programmable phase shifters and power supplies (not shown).

Radio-frequency circuitry 825 may include power combining and dividing circuitry 974 in some aspects. In some aspects, power combining and dividing circuitry 974 may operate bidirectionally, such that the same physical circuitry may be configured to operate as a power divider when the device is transmitting, and as a power combiner when the device is receiving. In some aspects, power combining and dividing circuitry 974 may include one or more wholly or partially separate circuitries to perform power dividing when the device is transmitting and power combining when the device is receiving. In some aspects, power combining and dividing circuitry 974 may include passive circuitry comprising one or more two-way power divider/combiners arranged in a tree. In some aspects, power combining and dividing circuitry 974 may include active circuitry comprising amplifier circuits.

In some aspects, radio-frequency circuitry 825 may connect to transmit circuitry 815 and receive circuitry 820 in FIG. 8 via one or more radio chain interfaces 976 or a combined radio chain interface 978.

In some aspects, one or more radio chain interfaces 976 may provide one or more interfaces to one or more receive or transmit signals, each associated with a single antenna structure, which may comprise one or more antennas.

In some aspects, the combined radio chain interface 978 may provide a single interface to one or more receive or transmit signals, each associated with a group of antenna structures comprising one or more antennas.

In some embodiments, the combined radio chain interface 978 may be used for mmWave communications, while the radio chain interfaces 976 may be used for lower-frequency communications.

Figure 10:
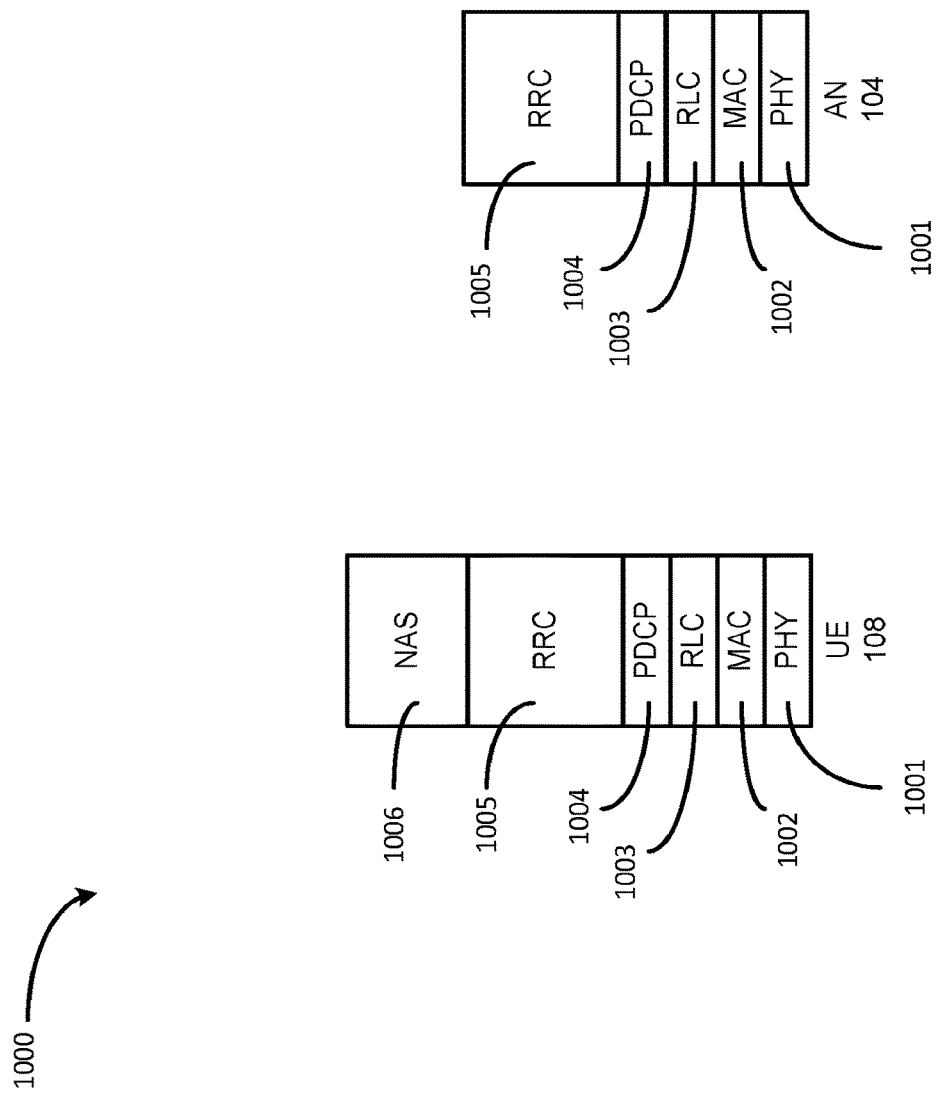
FIG. 10 illustrates a control-plane protocol stack in accordance with some embodiments.

FIG. 10 is an illustration of a protocol stack of a control plane 1000 in accordance with some embodiments. In this embodiment, the control plane 1000 is shown as a communications protocol stack between the UE 108 and the AN 104.

The PHY layer 1001 may transmit or receive information used by the MAC layer 1002 over one or more air interfaces. The PHY layer 1001 may further perform link adaptation or adaptive modulation and coding ("AMC"), power control, cell search (for example, for initial synchronization and handover purposes), and other measurements used by higher layers, such as the RRC layer 1005. The PHY layer 1001 may still further perform error detection on the transport channels, forward error correction ("FEC") coding/decoding of the transport channels, modulation/demodulation of physical channels, interleaving, rate matching, mapping onto physical channels, and Multiple Input Multiple Output ("MIMO") antenna processing. As described above, the PHY layer 1001 may process, construct, or signal downlink control information ("DCI") including the indications of the uplink transmit beam and link type; configure the uplink transmit beam; and measure the DL RS and provide feedback.

The MAC layer 1002 may perform mapping between logical channels and transport channels, multiplexing of MAC service data units ("SDUs") from one or more logical channels onto transport blocks ("TB") to be delivered to PHY via transport channels, de-multiplexing MAC SDUs to one or more logical channels from transport blocks ("TB") delivered from the PHY via transport channels, multiplexing MAC SDUs onto TBs, scheduling information reporting, error correction through hybrid automatic repeat request ("HARQ"), and logical channel prioritization.

The RLC layer 1003 may operate in a plurality of modes of operation, including: Transparent Mode ("TM"), Unacknowledged Mode ("UM"), and Acknowledged Mode ("AM"). The RLC layer 1003 may execute transfer of upper layer protocol data units ("PDUs"), error correction through automatic repeat request ("ARQ") for AM data transfers, and concatenation, segmentation and reassembly of RLC SDUs for UM and AM data transfers. The RLC layer 1003 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment. The PDCP layer 1004 may execute header compression and decompression of IP data, maintain PDCP Sequence Numbers ("SNs"), perform in-sequence delivery of upper layer PDUs at re-establishment of lower layers, eliminate duplicates of lower layer SDUs at re-establishment of lower layers for radio bearers mapped on RLC AM, cipher and decipher control-plane data, perform integrity protection and integrity verification of control-plane data, control timer-based discard of data, and perform security operations (for example, ciphering, deciphering, integrity protection, integrity verification, etc.).

The main services and functions of the RRC layer 1005 may include broadcast of system information (for example, included in Master Information Blocks ("MIBs") or System Information Blocks ("SIBs") related to the non-access stratum ("NAS")), broadcast of system information related to the access stratum ("AS"), paging, establishment, maintenance and release of an RRC connection between the UE and E-UTRAN (for example, RRC connection paging, RRC connection establishment, RRC connection modification, and RRC connection release), establishment, configuration, maintenance and release of point to point radio bearers, security functions including key management, inter radio access technology ("RAT") mobility, and measurement configuration for UE measurement reporting. As described above, the RRC layer 1005 may configure the PC process sets for PC procedures. Said MIBs and SIBs may comprise one or more information elements ("IEs"), which may each comprise individual data fields or data structures.

The UE 108 and the AN 104 may utilize a Uu interface (for example, a long-term evolution ("LTE")-Uu interface) to exchange control-plane data via a protocol stack comprising the PHY layer 1001, the MAC layer 1002, the RLC layer 1003, the PDCP layer 1004, and the RRC layer 1005.

The non-access stratum ("NAS") protocols 1006 form the highest stratum of the control plane between the UE 108 and a mobility management entity. The NAS protocols 1006 support the mobility of the UE 108 and the session management procedures to establish and maintain IP connectivity between the UE and a package gateway.

Figure 11:
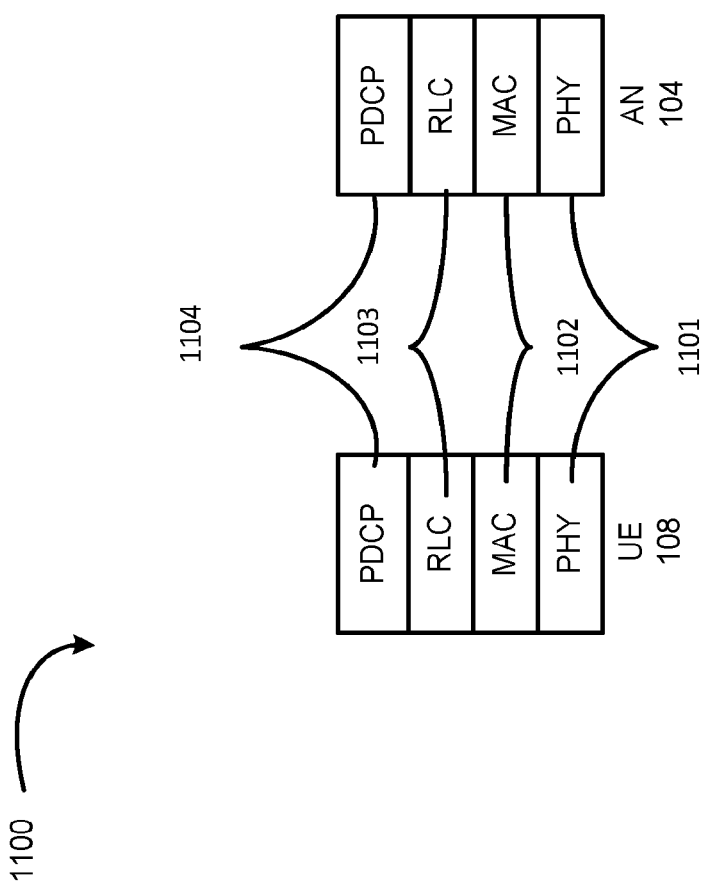
FIG. 11 illustrates a user-plane protocol stack in accordance with some embodiments.

FIG. 11 is an illustration of a protocol stack of a user plane in accordance with some embodiments. In this embodiment, the user plane 1100 is shown as a communications protocol stack between the UE 108 and the AN 104. The user plane 1100 may utilize at least some of the same protocol layers as the control plane 1000. For example, the UE 108 and the AN 104 may utilize a Uu interface (for example, an LTE-Uu interface) to exchange user-plane data via a protocol stack comprising a PHY layer 1101, a MAC layer 1102, an RLC layer 1103, and a PDCP layer 1104.

Figure 12:
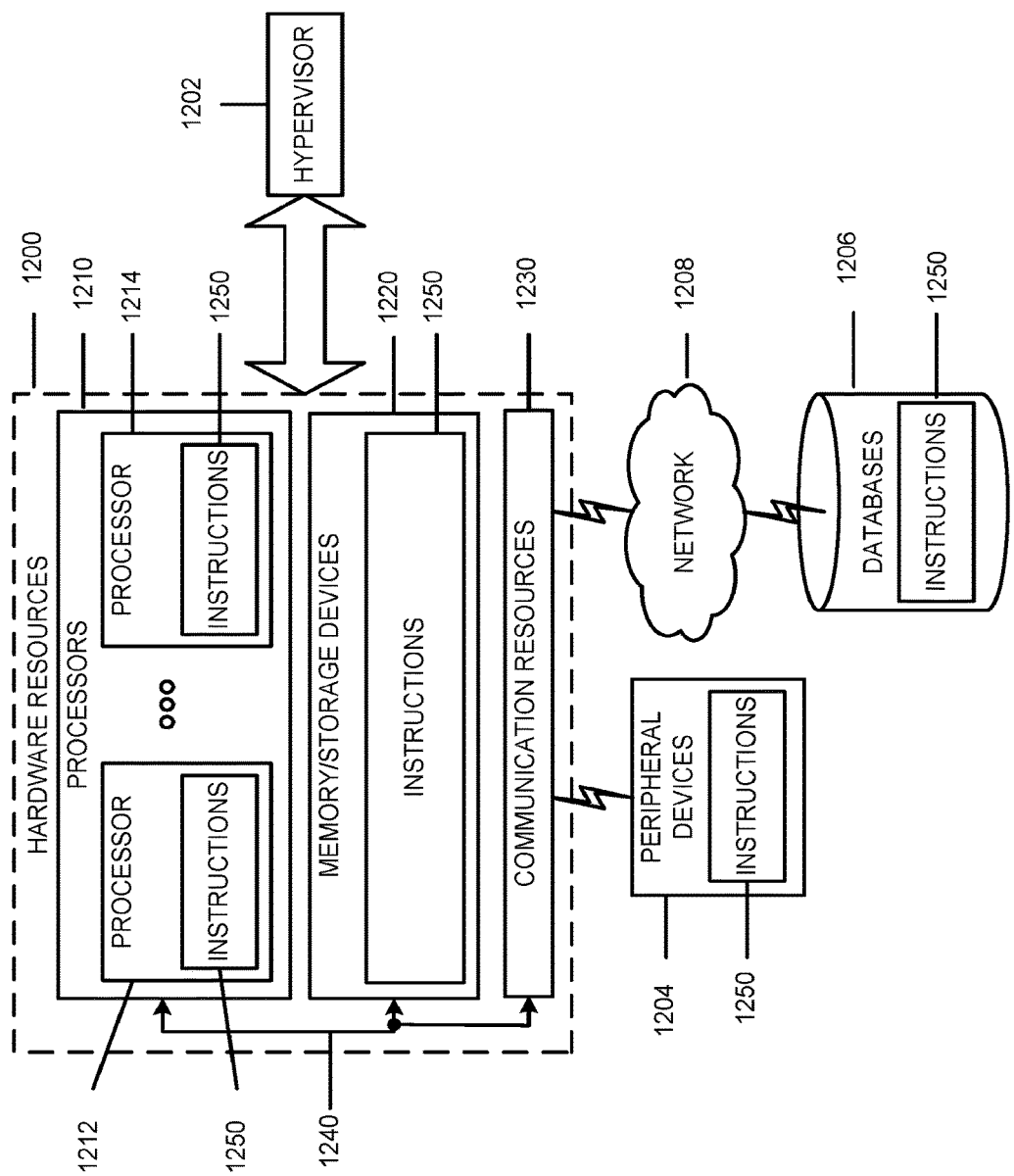
FIG. 12 illustrates hardware resources in accordance with some embodiments.

FIG. 12 is a block diagram illustrating components, according to some example embodiments, able to read instructions from a machine-readable or computer-readable medium (for example, a non-transitory machine-readable storage medium) and perform any one or more of the power control and beam selection methodologies discussed herein. Specifically, FIG. 12 shows a diagrammatic representation of hardware resources 1200 including one or more processors (or processor cores) 1210, one or more memory/storage devices 1220, and one or more communication resources 1230, each of which may be communicatively coupled via a bus 1240. For embodiments where node virtualization (for example, network function virtualization ("NFV")) is utilized, a hypervisor 1202 may be executed to provide an execution environment for one or more network slices/sub-slices to utilize the hardware resources 1200.

The processors 1210 (for example, a CPU, a reduced instruction set computing ("RISC") processor, a complex instruction set computing ("CISC") processor, a graphics processing unit ("GPU"), a digital signal processor ("DSP") such as a baseband processor, an application specific integrated circuit ("ASIC"), a radio-frequency integrated circuit ("RFIC"), another processor, or any suitable combination thereof) may include, for example, a processor 1212 and a processor 1214. The processors may correspond to any processors of the AN 104 or the UE 108 described herein.

The memory/storage devices 1220 may include main memory, disk storage, or any suitable combination thereof. The memory/storage devices 1220 may include, but are not limited to, any type of volatile or non-volatile memory such as dynamic random access memory ("DRAM"), static random-access memory ("SRAM"), erasable programmable read-only memory ("EPROM"), electrically erasable programmable read-only memory ("EEPROM"), Flash memory, solid-state storage, etc. The memory/storage devices 1220 may correspond to memory 208, CRM 602b, or CRM 604g.

The communication resources 1230 may include interconnection or network interface components or other suitable devices to communicate with one or more peripheral devices 1204 or one or more databases 1206 via a network 1208. For example, the communication resources 1230 may include wired communication components (for example, for coupling via a Universal Serial Bus ("USB")), cellular communication components, near-field communication ("NFC") components, Bluetooth® components (for example, Bluetooth® Low Energy), Wi-Fi® components, and other communication components.

Instructions 1250 may comprise software, a program, an application, an applet, an app, or other executable code for causing at least any of the processors 1210 to perform any one or more of the methodologies discussed herein.

The instructions 1250 may cause the processors 1210 to perform the operation flow/algorithmic structure 300, 400 or other operations of the AN 104 or the UE 108 described herein.

The instructions 1250 may reside, completely or partially, within at least one of the processors 1210 (for example, within the processor's cache memory), the memory/storage devices 1220, or any suitable combination thereof. Furthermore, any portion of the instructions 1250 may be transferred to the hardware resources 1200 from any combination of the peripheral devices 1204 or the databases 1206. Accordingly, the memory of processors 1210, the memory/storage devices 1220, the peripheral devices 1204, and the databases 1206 are examples of computer-readable and machine-readable media.

The resources described in FIG. 12 may also be referred to as circuitry. For example, communication resources 1230 may also be referred to as communication circuitry 1230. Some non-limiting examples are provided below.

Example 1 includes one or more computer-readable media having instructions that, when executed by one or more processors, cause a user equipment ("UE") to: process configuration information to determine a power control ("PC") parameter set of a PC process that is beam-specific, the PC parameter set to include a path loss scaling factor, a command to perform a closed-loop PC process, or a path loss change parameter to be used to trigger a power headroom report ("PHR"); and perform a PC procedure based on the PC parameter set.

Example 2 includes the one or more computer-readable media of example 1 or some other example herein, wherein the PC parameter set further includes an indication of a downlink reference signal that defines a downlink beam associated with the PC process or an indication of a beam-pair link that includes the downlink reference signal and an uplink sounding reference signal.

Example 3 includes the one or more computer-readable media of example 2 or some other example herein, wherein the PC parameter set includes the path loss change parameter and to perform the PC procedure, the UE is to: calculate a path loss estimate based on the downlink reference signal; determine the PHR is triggered based on the path loss estimate and the path loss change parameter; and generate and cause the PHR to be sent based on determination that the PHR is triggered.

Example 4 includes the one or more computer-readable media of example 1 or 2 or some other example herein, wherein the PC parameter set includes the command to perform the closed-loop PC process and the PC procedure is the closed-loop PC process.

Example 5 includes the one or more computer-readable media of example 1 or 2 or some other example herein, wherein the configuration information has a plurality of PC parameter sets that correspond to a respective plurality of PC processes and the instructions, when executed, further cause the UE to perform individual PC procedures that correspond to individual PC processes of the plurality of PC processes.

Example 6 includes the one or more computer-readable media of example 1 or 2 or some other example herein, wherein the instructions, when executed, further cause the UE to: determine a downlink receive beam for a configured downlink reference signal; and select an uplink receive beam that corresponds to the downlink receive beam.

Example 7 includes the one or more computer-readable media of example 6 or some other example herein, wherein the instructions, when executed, further cause the UE to: determine the downlink receive beam based on explicit or implicit signaling by a next generation node B ("gNB").

Example 8 includes the one or more computer-readable media of example 1 or 2 or some other example herein, wherein the instructions, when executed, further cause the UE to: determine a downlink control channel resource set ("CORESET") that includes physical downlink control channel ("PDCCH") candidates for downlink and uplink data assignments is quasi co-located ("QCL") with a first downlink reference signal; detect a PDCCH of the downlink CORESET that schedules a downlink data assignment or an uplink data assignment; and determine a downlink receive beam or an uplink transmit beam that corresponds to the downlink transmit beam used to transmit the PDCCH; and use the determined downlink receive beam or the uplink transmit beam for the downlink data assignment or the uplink data assignment, respectively.

Example 9 includes the one or more computer-readable media of example 8 or some other example herein, wherein the instructions, when executed, further cause the UE to: determine the PDCCH schedules an uplink data assignment for a physical uplink shared channel ("PUSCH"); and cause the PUSCH to be transmitted in the uplink data assignment with the determined uplink transmit beam.

Example 10 includes the one or more computer-readable media of example 1 or 2 or some other example herein, wherein the instructions when executed, further cause the UE to: determine a downlink control channel resource set ("CORESET") that includes physical downlink control channel ("PDCCH") candidates for downlink and uplink data assignments is quasi co-located ("QCL") with a beam pair link that includes a downlink reference signal and a sounding reference signal; detect a PDCCH of the downlink CORESET that schedules a physical uplink control channel ("PUSCH"); determine an uplink transmit beam that corresponds to the sounding reference signal; and cause the PUSCH to be transmitted with the uplink transmit beam.

Example 11 includes the one or more computer-readable media of example 1 or 2 or some other example herein, wherein the instructions, when executed, further cause the UE to: process the configuration information to determine a plurality of PC parameter sets; process uplink data scheduling information to determine an index that corresponds to a first PC parameter set of the plurality of PC parameter sets; determine an uplink transmit beam based on a downlink beam associated with the first PC parameter set; and conduct, based on a command in the first PC parameter set, a closed-loop PC process to determine a transmission power for the uplink transmit beam.

Example 12 includes the one or more computer-readable media of example 1 or 2 or some other example herein, wherein the instructions, when executed, further cause the UE to: calculate a power headroom value based on the PC parameter set.

Example 13 includes the one or more computer-readable media of example 12 or some other example herein, wherein the power headroom value is $PH_c^b[t]$ and equals $P_{CMAX,c}^b - \{P_{0,PUSCH} + \alpha_c^b PL_c^b + g[t]_c^b\}$, where b is a beam index, c is a serving cell index, $P_{CMAX,c}^b$ is a maximum UE transmission power of beam b in serving cell c, $P_{0,PUSCH}$ is a reference receive power of a physical uplink shared channel ("PUSCH"), $\alpha_c^b$ is a configured scaling factor of path loss in beam b of serving cell c, $PL_c^b$ is a path loss estimate of beam b in serving cell c, and $g[t]_c^b$ is a command to perform a closed-loop PC process at subframe t for beam b in serving cell c.

Example 14 includes the one or more computer-readable media of example 13 or some other example herein, wherein the maximum UE transmission power in beam b is based on an effect of an off-boresight main beam due to UE antenna rotation.

Example 15 includes the one or more computer-readable media of example 1 or 2 or some other example herein, wherein the PC parameter set is a first PC parameter set, the PC process is a first PC process that is specific to a downlink reference signal and the instructions, when executed, further cause the UE to: process the configuration information to determine a second PC parameter set of a second PC process that is specific to a beam-pair link ("BPL").

Example 16 includes an apparatus to be implemented in a user equipment ("UE"), the apparatus comprising: memory; and processing circuitry, coupled with the memory, to receive configuration information from an access node and store, in the memory based on the configuration information, a power control ("PC") parameter set of a PC process that corresponds to a downlink ("DL") reference signal ("RS") or a beam-pair link ("BPL"); and perform a PC procedure with respect to the DL RS or the BPL based on the PC parameter set.

Example 17 includes the apparatus of example 16 or some other example herein, wherein the PC parameter set is to include a path loss scaling factor, a command to perform a closed-loop PC process, or a path loss change parameter to be used to trigger a power headroom report ("PHR").

Example 18 includes the apparatus of example 17 or some other example herein, wherein the PC parameter set includes the path loss change parameter and to perform the PC procedure, the processing circuitry is to: calculate a path loss estimate based on the downlink reference signal or BPL; determine the PHR is triggered based on the path loss estimate and the path loss change parameter; and generate and cause the PHR to be sent based on determination that the PHR is triggered.

Example 19 includes the apparatus of example 17 or some other example herein, wherein the PC parameter set includes the command to perform the closed-loop PC process and the PC procedure is the closed-loop PC process.

Example 20 includes the apparatus of example 16 or some other example herein, wherein the PC parameter set is a first PC parameter set, the PC process is a first PC process that is specific to the DL RS and the processing circuitry is further to: process the configuration information to determine a second PC parameter set of a second PC process that is specific to a beam pair link ("BPL").

Example 21 includes the apparatus of any one of examples 16-20 or some other example herein, wherein the processing circuitry is further to receive power control command from the access node and the apparatus further comprises: a power management interface coupled with the processing circuitry, the power management interface to send power control signals, based on the power control command, to cause the UE to transmit uplink signals with an uplink transmit power.

Example 22 includes one or more computer-readable media having instructions that, when executed by one or more processors, cause an access node to: transmit configuration information to a user equipment ("UE") to configure a beam-specific power control ("PC") process with a PC parameter set that includes a path loss scaling factor, a command to perform a closed-loop PC process, or a path loss change parameter to be used to trigger a power headroom report ("PHR"); determine a downlink transmit beam based on a PC procedure; and signal an indication of the downlink transmit beam to the UE.

Example 23 includes the one or more computer-readable media of example 22 or some other example herein, wherein the PC parameter set further includes an indication of a downlink reference signal that defines a downlink beam associated with the PC process or an indication of a beam-pair link that includes the downlink reference signal and an uplink sounding reference signal.

Example 24 includes the one or more computer-readable media of example 23 or some other example herein, wherein the PC parameter set includes the path loss change parameter and the instructions, when executed, further cause the AN to signal the indication using explicit or implicit signaling.

Example 25 includes the one or more computer-readable media of example 23 or some other example herein, wherein the configuration information is to configure a plurality of beam-specific PC process with a first beam-specific PC process associated with a downlink reference signal and a second beam-specific power control process associated with a beam-pair link.

Example 26 includes processing configuration information to determine a power control ("PC") parameter set of a PC process that is beam-specific, the PC parameter set to include a path loss scaling factor, a command to perform a closed-loop PC process, or a path loss change parameter to be used to trigger a power headroom report ("PHR"); and performing a PC procedure based on the PC parameter set.

Example 27 includes the method of example 26 or some other example herein, wherein the PC parameter set further includes an indication of a downlink reference signal that defines a downlink beam associated with the PC process or an indication of a beam-pair link that includes the downlink reference signal and an uplink sounding reference signal.

Example 28 includes the method of example 27 or some other example herein, wherein the PC parameter set includes the path loss change parameter and performing the PC procedure includes: calculating a path loss estimate based on the downlink reference signal; determining the PHR is triggered based on the path loss estimate and the path loss change parameter; and generating and causing the PHR to be sent based on determination that the PHR is triggered.

Example 29 includes the method of example 26 or 27 or some other example herein, wherein the PC parameter set includes the command to perform the closed-loop PC process and the PC procedure is the closed-loop PC process.

Example 30 includes the method of example 26 or 27 or some other example herein, wherein the configuration information has a plurality of PC parameter sets that correspond to a respective plurality of PC processes and the method further comprises performing individual PC procedures that correspond to individual PC processes of the plurality of PC processes.

Example 31 includes the method of example 26 or 27 or some other example herein, wherein the method further comprises: determining a downlink receive beam for a configured downlink reference signal; and selecting an uplink receive beam that corresponds to the downlink receive beam.

Example 32 includes the method of example 31 or some other example herein, further comprising: determining the downlink receive beam based on explicit or implicit signaling by a next generation node B ("gNB").

Example 33 includes the method of example 26 or 27 or some other example herein, further comprising: determining a downlink control channel resource set ("CORESET") that includes physical downlink control channel ("PDCCH") candidates for downlink and uplink data assignments is quasi co-located ("QCL") with a first downlink reference signal; detecting a PDCCH of the downlink CORESET that schedules a downlink data assignment or an uplink data assignment; determining a downlink receive beam or an uplink transmit beam that corresponds to the downlink transmit beam used to transmit the PDCCH; and using the determined downlink receive beam or the uplink transmit beam for the downlink data assignment or the uplink data assignment, respectively.

Example 34 includes the method of example 33 or some other example herein, further comprising: determining the PDCCH schedules an uplink data assignment for a physical uplink shared channel ("PUSCH"); and causing the PUSCH to be transmitted in the uplink data assignment with the determined uplink transmit beam.

Example 35 includes the method of example 26 or 27 or some other example herein, further comprising: determining a downlink control channel resource set ("CORESET") that includes physical downlink control channel ("PDCCH") candidates for downlink and uplink data assignments is quasi co-located ("QCL") with a beam pair link that includes the first downlink reference signal and a sounding reference signal; detecting a PDCCH of the downlink CORESET that schedules a physical uplink control channel ("PUSCH"); determining an uplink transmit beam that corresponds to the sounding reference signal; and causing the PUSCH to be transmitted with the uplink transmit beam.

Example 36 includes the method of example 26 or 27 or some other example herein, further comprising: processing the configuration information to determine a plurality of PC parameter sets; processing uplink data scheduling information to determine an index that corresponds to a first PC parameter set of the plurality of PC parameter sets; determining an uplink transmit beam based on a downlink beam associated with the first PC parameter set; and conducting, based on a command in the first PC parameter set, a closed-loop PC process to determine a transmission power for the uplink transmit beam.

Example 37 includes the method of example 26 or 27 or some other example herein, further comprising: calculating a power headroom value based on the PC parameter set.

Example 38 includes the method of example 37 or some other example herein, wherein the power headroom value is $PH_c^b[t]$ and equals $P_{CMAX,c}^b - \{P_{0,PUSCH} + \alpha_c^b PL_c^b + g[t]_c^b\}$, where b is a beam index, c is a serving cell index, $P_{CMAX,c}^b$ is a maximum UE transmission power of beam b in serving cell c, $P_{0,PUSCH}$ is a reference receive power of a physical uplink shared channel ("PUSCH"), $\alpha_c^b$ is a configured scaling factor of path loss in beam b of serving cell c, $PL_c^b$ is a path loss estimate of beam b in serving cell c, and $g[t]_c^b$ is a command to perform a closed-loop PC process at subframe t for beam b in serving cell c.

Example 39 includes the method of example 38 or some other example herein, wherein the maximum UE transmission power in beam b is based on an effect of an off-boresight main beam due to UE antenna rotation.

Example 40 includes the method of example 26 or 27 or some other example herein, wherein the PC parameter set is a first PC parameter set, the PC process is a first PC process that is specific to a downlink reference signal and the method further comprises: processing the configuration information to determine a second PC parameter set of a second PC process that is specific to a beam pair link ("BPL").

Example 41 includes a method comprising: receiving configuration information from an access node and storing, in the memory based on the configuration information, a power control ("PC") parameter set of a PC process that corresponds to a downlink ("DL") reference signal ("RS") or a beam-pair link ("BPL"); and performing a PC procedure with respect to the DL RS or the BPL based on the PC parameter set.

Example 42 includes the method of example 41 or some other example herein, wherein the PC parameter set is to include a path loss scaling factor, a command to perform a closed-loop PC process, or a path loss change parameter to be used to trigger a power headroom report ("PHR").

Example 43 includes the method of example 42 or some other example herein, wherein the PC parameter set includes the path loss change parameter and performing the PC procedure comprises: calculating a path loss estimate based on the downlink reference signal or BPL; determining the PHR is triggered based on the path loss estimate and the path loss change parameter; and generating and causing the PHR to be sent based on determination that the PHR is triggered.

Example 44 includes the method of example 42 or some other example herein, wherein the PC parameter set includes the command to perform the closed-loop PC process and the PC procedure is the closed-loop PC process.

Example 45 includes the method of example 42 or some other example herein, wherein the PC parameter set is a first PC parameter set, the PC process is a first PC process that is specific to the DL RS and the method further comprises: processing the configuration information to determine a second PC parameter set of a second PC process that is specific to a beam pair link ("BPL").

Example 46 includes the method of any one of examples 41-45 or some other example herein, further comprising: receiving a power control command from the access node; and sending power control signals, based on the power control command, to cause the UE to transmit uplink signals with an uplink transmit power.

Example 47 includes a method comprising: transmitting configuration information to a user equipment ("UE") to configure a beam-specific power control ("PC") process with a PC parameter set that includes a path loss scaling factor, a command to perform a closed-loop PC process, or a path loss change parameter to be used to trigger a power headroom report ("PHR"); determining a downlink transmit beam based on a PC procedure; and signaling an indication of the downlink transmit beam to the UE.

Example 48 includes the method of example 47 or some other example herein, wherein the PC parameter set further includes an indication of a downlink reference signal that defines a downlink beam associated with the PC process or an indication of a beam-pair link that includes the downlink reference signal and an uplink sounding reference signal.

Example 49 includes the method of example 48 or some other example herein, wherein the PC parameter set includes the path loss change parameter and the method further comprises signaling the indication using explicit or implicit signaling.

Example 50 may include an apparatus comprising means to perform one or more elements of a method described in or related to any of examples 26-49, or any other method or process described herein.

Example 51 may include one or more non-transitory computer-readable media comprising instructions to cause an electronic device, upon execution of the instructions by one or more processors of the electronic device, to perform one or more elements of a method described in or related to any of examples 26-49, or any other method or process described herein.

Example 52 may include an apparatus comprising logic, modules, and/or circuitry to perform one or more elements of a method described in or related to any of examples 26-49, or any other method or process described herein.

Example 53 may include a method, technique, or process as described in or related to any of examples 26-49, or portions or parts thereof.

Example 54 may include an apparatus comprising: one or more processors and one or more computer-readable media comprising instructions that, when executed by the one or more processors, cause the one or more processors to perform the method, techniques, or process as described in or related to any of examples 26-49, or portions thereof.

Example 55 may include a method of communicating in a wireless network as shown and described herein.

Example 56 may include a system for providing wireless communication as shown and described herein.

Example 57 may include a device for providing wireless communication as shown and described herein.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

What is claimed is:

1. Method for operating a user equipment (UE), comprising:
    determining, from configuration information, a power control (PC) parameter set of a beam-specific PC process, the PC parameter set comprising a path loss change parameter to be used to trigger a power headroom report (PHR);
    performing a PC procedure of the beam-specific PC process based on the PC parameter set, the PC procedure comprising:
        calculating a path loss estimate based on a downlink reference signal that defines a downlink receive beam associated with the beam-specific PC process;
        triggering the PHR based on the path loss estimate and the path loss change parameter; and
        calculating a power headroom value based on the PC parameter set, comprising: a beam index, b, a serving cell index, c, a maximum LE transmission power of beam b in serving cell c, a reference receive power of a physical uplink shared channel (PUSCH), a configured scaling factor of path loss of beam b in serving cell c, a path loss estimate of beam b in serving cell c, and a command to perform a closed-loop PC process at subframe t for beam b in serving cell c; and
    transmitting the PIM comprising the power headroom value.

2. The method of claim 1, wherein the PC parameter set further includes an indication of the downlink reference signal or an indication of a beam-pair link that corresponds to the downlink reference signal and an uplink sounding reference signal.

3. The method of claim 1, wherein the PC parameter set further includes the command to perform the closed-loop PC process, and wherein a second PC procedure of the beam-specific PC process comprises the closed-loop PC process.

4. The method of claim 1, wherein the configuration information comprises a plurality of PC parameter sets including the PC parameter set, that corresponds to a respective plurality of PC processes including the beam-specific PC process, the method further comprises performing remaining individual PC procedures that correspond to remaining individual PC processes of the respective plurality of PC processes.

5. The method of claim 1, further comprising:
    determining the downlink receive beam for the downlink reference signal; and
    selecting an uplink transmit beam that corresponds to the determined downlink receive beam.

6. The method of claim 5, further comprising determining the downlink receive beam based on explicit or implicit signaling by a base station.

7. The method of claim 1, further comprising:
    determining a downlink control channel resource set (CORESET) comprising physical downlink control channel (PDCCH) candidates for downlink and uplink data assignments, wherein the PDCCH candidates are quasi co-located (QCL) with the downlink reference signal;
    detecting a PDCCH candidate of the downlink CORESET that schedules a downlink data assignment or an uplink data assignment;
    determining the downlink receive beam or an uplink transmit beam that corresponds to a downlink transmit beam used to transmit the PDCCH candidate; and
    using the downlink receive beam or the uplink transmit beam for the downlink data assignment or the uplink data assignment, respectively.

8. The method of claim 7, further comprising:
    determining the PDCCH candidate that schedules an uplink data assignment for a physical uplink shared channel (PUSCH); and
    transmitting, via the uplink transmit beam, the PUSCH in the uplink data assignment.

9. The method of claim 1, further comprising:
    determining a downlink control channel resource set (CORESET) that includes physical downlink control channel (PDCCH) candidates for downlink and uplink data assignments, wherein the PDCCH candidates are quasi co-located (QCL) with a beam-pair link corresponding to the downlink reference signal and a sounding reference signal;

detecting a PDCCH candidate of the downlink CORESET that schedules a physical uplink control channel (PUSCH), determining an uplink transmit beam that corresponds to the sounding reference signal; and transmitting the PUSCH via the uplink transmit beam.

10. The method of claim 1, further comprising:
processing the configuration information to determine a plurality of PC parameter sets including the PC parameter set;
processing uplink data scheduling information to determine an index that corresponds to a second PC parameter set of the plurality of PC parameter sets;
determining an uplink transmit beam based on the downlink receive beam that is associated with the PC parameter set; and
conducting, based on a command in the PC parameter set, the closed-loop PC process to determine a transmission power for the determined uplink transmit beam.

11. The method of claim 1, wherein the maximum UE transmission power in beam b is based on an effect of an off-boresight main beam due to UE antenna rotation.

12. The method of claim 1, wherein the PC parameter set is a first PC parameter set, and wherein the beam-specific PC process is a first PC process that is specific to the downlink reference signal, the method further comprises: determining from the configuration information, a second PC parameter set of a second PC process that is specific to a beam-pair link.

13. An apparatus, comprising:
a memory; and
a processor communicatively coupled with the memory, wherein the processor is configured to:
receive configuration information from a base station;
store, in the memory based on the configuration information, a power control (PC) parameter set of a PC process that corresponds to a downlink reference signal or a beam-pair link, the PC parameter set comprising a path loss scaling factor, a command to perform a closed-loop PC process, or a path loss change parameter to be used to trigger a power headroom report (PHR);
perform a PC procedure with respect to the downlink reference signal or the beam-pair link based on the PC parameter set, wherein the processor is configured to:
calculate a path loss estimate based on the downlink reference signal or the beam-pair link;
determine the PHR based on the path loss estimate and the path loss change parameter; and
calculate a power headroom value based on the PC parameter set, comprising: a beam index, b, a serving cell index, c, a maximum apparatus transmission power of beam b in serving cell c, a reference receive power of a physical uplink shared channel (PUSCH), a configured scaling factor of path loss of beam b in serving cell c, a path loss estimate of beam b in serving cell c, and a command to perform a closed-loop PC process at subframe for beam h in serving cell c; and
transmit the PHR comprising the power headroom value.

14. The apparatus of claim 13, wherein the PC parameter set comprises the command to perform the closed-loop PC process of a second PC procedure of the PC process, the processor is configured to perform the closed-loop PC process.

15. The apparatus of claim 13, wherein the PC parameter set is a first PC parameter set,
wherein the PC process is a first PC process that is specific to the downlink reference signal, and wherein the processor is further configured to:
determine from the configuration information, a second PC parameter set of a second PC process that is specific to the beam-pair link.

16. The apparatus of claim 13, wherein the processor is further configured to receive a power control command from the base station, and wherein the apparatus further comprises:
a power management interface communicatively coupled with the processor, wherein the power management interface is configured to send power control signals, based on the power control command, to cause the apparatus to transmit uplink signals with an uplink transmit power.

17. One or more non-transitory computer-readable media having instructions that, when executed by one or more processors, cause a base station to perform operations comprising:
transmitting configuration information to a user equipment (LTE) to configure a beam-specific power control (PC) process with a PC parameter set that includes a path loss scaling factor, a command to perform a closed-loop PC process, or a path loss change parameter to be used to trigger a power headroom report (PEER);
receiving the PHR comprising a power headroom value based on the PC parameter set and the beam-specific PC process, comprising: a beam index, h, a serving cell index, c, a maximum UE transmission power of beam b in serving cell c, a reference receive power of a physical uplink shared channel (PUSCH), a configured scaling factor of path loss of beam b in serving cell c, a path loss estimate of beam b in serving cell c, and a command to perform a closed-loop PC process at subframe for beam h in serving cell c;
determining a downlink transmit beam based at least on the PIM; and
signaling an indication of the downlink transmit beam to the UE.

18. The one or more non-transitory computer-readable media of claim 17, wherein the PC parameter set further includes an indication of a downlink reference signal that defines a downlink receive beam associated with the beam-specific PC process or an indication of a beam-pair link that includes the downlink reference signal and an uplink sounding reference signal.

19. The one or more non-transitory computer-readable media of claim 18, wherein the PC parameter set includes the path loss change parameter and wherein the operations further comprise transmitting the indication using explicit or implicit signaling.

20. The one or more non-transitory computer-readable media of claim 18, wherein the configuration information configures a plurality of beam-specific PC processes including the beam-specific PC process, wherein the beam-specific PC process is a first beam-specific PC process associated with a downlink reference signal and a second beam-specific PC process of the plurality of beam-specific PC processes is associated with a beam-pair link.

* * * * *

UNITED STATES PATENT AND TRADEMARK OFFICE
CERTIFICATE OF CORRECTION

PATENT NO. : 11,985,609 B2  
APPLICATION NO. : 18/074374  
DATED : May 14, 2024  
INVENTOR(S) : Miao Page 1 of 1

It is certified that error appears in the above-identified patent and that said Letters Patent is hereby corrected as shown below:

In the Claims

In Column 25, Claim 1, Line 58, delete "Method" and insert -- A method --.

In Column 26, Claim 1, Line 8, delete "LE" and insert -- UE --.

In Column 26, Claim 1, Line 16, delete "PIM" and insert -- PHR --.

In Column 27, Claim 9, Line 8, delete "(PUSCH)," and insert -- (PUSCH); --.

In Column 27, Claim 13, Line 64, after "subframe" insert -- t --.

In Column 27, Claim 13, Line 64, delete "h" and insert -- b --.

In Column 28, Claim 17, Line 28, delete "(LTE)" and insert -- (UE) --.

In Column 28, Claim 17, Line 33, delete "(PEER);" and insert -- (PHR); --.

In Column 28, Claim 17, Line 36, delete "h," and insert -- b, --.

In Column 28, Claim 17, Line 44, after "subframe" insert -- t --.

In Column 28, Claim 17, Line 44, delete "h" and insert -- b --.

In Column 28, Claim 17, Line 46, delete "PIM;" and insert -- PHR; --.

Signed and Sealed this  
Twenty-seventh Day of August, 2024

Katherine Kelly Vidal  
*Director of the United States Patent and Trademark Office*